United States Patent
Gupta et al.

(10) Patent No.: US 12,159,343 B2
(45) Date of Patent: Dec. 3, 2024

(54) ACCELERATED BOUNDING VOLUME HIERARCHY (BVH) TRAVERSAL FOR SHADOW RAYS

(71) Applicant: QUALCOMM Incorporated, San Diego, CA (US)

(72) Inventors: Piyush Gupta, Bangalore (IN); David Kirk McAllister, Holladay, UT (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/845,864

(22) Filed: Jun. 21, 2022

(65) Prior Publication Data
US 2023/0410407 A1    Dec. 21, 2023

(51) Int. Cl.
*G06T 15/06* (2011.01)
*G06F 7/24* (2006.01)
*G06T 17/10* (2006.01)

(52) U.S. Cl.
CPC ............... *G06T 15/06* (2013.01); *G06F 7/24* (2013.01); *G06T 17/10* (2013.01); *G06T 2210/21* (2013.01)

(58) Field of Classification Search
CPC ......... G06T 15/06; G06T 15/60; G06T 17/10; G06T 2210/21; G06F 7/24
USPC ......................................... 345/418, 421, 522
See application file for complete search history.

(56) References Cited

U.S. PATENT DOCUMENTS

| | | | |
|---|---|---|---|
| 2010/0053162 A1* | 3/2010 | Dammertz | G06T 15/06 345/522 |
| 2015/0109292 A1* | 4/2015 | Lee | G06T 15/06 345/421 |
| 2019/0088002 A1* | 3/2019 | Howson | G06T 15/40 |
| 2019/0355166 A1* | 11/2019 | Clark | G06T 17/005 |
| 2020/0051315 A1* | 2/2020 | Laine | G06T 15/06 |
| 2021/0390757 A1* | 12/2021 | Muthler | G06T 15/005 |

(Continued)

OTHER PUBLICATIONS

Daniel M., et al., "A Survey on Bounding Volume Hierarchies for Ray Tracing", Computer Graphics Forum: Journal of the European Association for Computer Graphics, Wiley-blackwell, Oxford, vol. 40, No. 2, Jun. 4, 2021, pp. 683-712, XP071554288, ISSN: 0167-7055, DOI: 10.1111/CGF. 142662, section 6.1.2.

(Continued)

*Primary Examiner* — Prabodh M Dharia
(74) *Attorney, Agent, or Firm* — Polsinelli

(57) ABSTRACT

Systems and techniques are provided for accelerated shadow ray traversal for a hierarchical structure for ray tracing. For instance, a process can include obtaining a hierarchical acceleration data structure, the hierarchical acceleration data structure including one or more primitives of a scene object. Two or more nodes included in a same level of the hierarchical acceleration data structure can be sorted into a sort order, the sort order based on a sorting parameter value determined for each respective node of the two or more nodes. The sorting parameter value can be associated with a probability of determining a ray-opaque primitive intersection for each respective node of the two or more nodes. An intersection between a shadow ray and an opaque primitive included in a node of the two or more nodes can be determined based on traversing the hierarchical acceleration data structure using the sort order.

14 Claims, 11 Drawing Sheets

(56) References Cited

U.S. PATENT DOCUMENTS

2024/0095996 A1* 3/2024 Muthler .................. G06T 15/06

OTHER PUBLICATIONS

Feltman N., et al., "SRDH: Specializing BVH Construction and Traversal Order Using Representative Shadow Ray Sets", Jun. 15, 2022, 7 pages, XP93049510, sections 2, 3.3, 4.1.
International Search Report and Written Opinion—PCT/US2023/067776—ISA/EPO—Sep. 22, 2023.
Ize T., et al., "RTSAH Traversal Order for Occlusion Rays", Computer Graphics Forum: Journal of the European Association for Computer Graphics, Wiley-blackwell, Oxford, vol. 30, No. 2, Apr. 28, 2011, pp. 297-305, XP071551996, ISSN: 0167-7055, DOI: 10.1111/J.1467-8659.2011.01861.X, section 1, 2.1, 3, 4.1.
Nah J-H., et al., "SATO: Surface Area Traversal Order for Shadow Ray Tracing", Computer Graphics Forum: Journal of the European Association for Computer Graphics, Wiley-blackwell, Oxford, vol. 33, No. 6, Mar. 14, 2014, pp. 167-177, XP071544688, ISSN: 0167-7055, DOI: 10.1111/CGF.12341, abstract, sections 3, 3.2, 3.3.
Ogaki S., et al., "An N-ary BVH Child Node Sorting Technique for Occlusion Tests", Journal of Computer Graphics Techniques, vol. 5, No. 2, Jan. 1, 2016, pp. 22-37, XP093081715, ISSN: 2331-7418, sections 1, 2, 3,3.2, 4, 4.2, 4.3, A.
Ogaki S., et al., "MBVH Child Node Sorting for Fast Occlusion Test", Proceedings of Eurographics Symposium on Rendering—Experimental Ideas Implementations, Jan. 1, 2015, pp. 57-64, XP093081719, DOI: 10.2312/sre.20151167, abstract, sections 1, 3, 3.1, 3.3.

* cited by examiner

700

Obtain A Hierarchical Acceleration Data Structure, The Hierarchical Acceleration Data Structure Including One Or More Primitives Of A Scene Object
702

Sort Two Or More Nodes Included In A Same Level Of The Hierarchical Acceleration Data Structure Into A Sort Order Based On A Sorting Parameter Value Determined For Each Respective Node Of The Two Or More Nodes, Wherein The Sorting Parameter Value Is Associated With A Probability Of Determining A Ray-Opaque Primitive Intersection For Each Respective Node Of The Two Or More Node
704

Determine An Intersection Between A Shadow Ray And An Opaque Primitive Included In A Node Of The Two Or More Nodes Based On Traversing The Hierarchical Acceleration Data Structure Using The Sort Order
706

FIG. 7

ACCELERATED BOUNDING VOLUME HIERARCHY (BVH) TRAVERSAL FOR SHADOW RAYS

FIELD

The present disclosure generally relates to graphics processing. For example, aspects of the present disclosure are related to systems and techniques for determining shadow rays using a hierarchical structure for ray tracing.

BACKGROUND

Ray tracing is a computer graphics technique that can be used to generate images by tracing paths of light through a three-dimensional scene, simulating interactions with objects illuminated by light sources, and determining ray intersections. Ray intersections can include ray-primitive intersections or ray-object intersections. Primitives are geometric shapes that can be used to construct or model larger three-dimensional objects. For example, primitives can include triangles or polygons.

Ray tracing can be used to generate realistic images, including shadows, of a three-dimensional scene. Scene geometry can be stored in an acceleration data structure that groups scene primitives. An acceleration data structure can be used to accelerate the process of ray tracing by improving the efficiency of ray intersection tests and/or calculations. For example, a bounding volume hierarchy (BVH) is an acceleration data structure that can group scene primitives in a hierarchical tree of bounding volumes enclosing one or more of the scene primitives. Ray tracing can be performed by traversing these hierarchies to determine ray-primitive and/or ray-object intersections.

BRIEF SUMMARY

In some examples, systems and techniques are described for determining shadow rays using a hierarchical structure for ray tracing. For example, the systems and techniques can be used to accelerate shadow ray traversal for a bounding volume hierarchy (BVH). According to at least one illustrative example, a method is provided for ray tracing, the method including: obtaining a hierarchical acceleration data structure, the hierarchical acceleration data structure including one or more primitives of a scene object; sorting two or more nodes included in a same level of the hierarchical acceleration data structure into a sort order based on a sorting parameter value determined for each respective node of the two or more nodes, wherein the sorting parameter value is associated with a probability of determining a ray-opaque primitive intersection for each respective node of the two or more nodes; and determining an intersection between a shadow ray and an opaque primitive included in a node of the two or more nodes based on traversing the hierarchical acceleration data structure using the sort order.

In another example, an apparatus for ray tracing is provided that includes a memory (e.g., configured to store data, such as virtual content data, one or more images, etc.) and one or more processors (e.g., implemented in circuitry) coupled to the memory. The one or more processors are configured to and can: obtain a hierarchical acceleration data structure, the hierarchical acceleration data structure including one or more primitives of a scene object; sort two or more nodes included in a same level of the hierarchical acceleration data structure into a sort order based on a sorting parameter value determined for each respective node of the two or more nodes, wherein the sorting parameter value is associated with a probability of determining a ray-opaque primitive intersection for each respective node of the two or more nodes; and determine an intersection between a shadow ray and an opaque primitive included in a node of the two or more nodes based on traversing the hierarchical acceleration data structure using the sort order.

In another example, a non-transitory computer-readable medium is provided that has stored thereon instructions that, when executed by one or more processors, cause the one or more processors to: obtain a hierarchical acceleration data structure, the hierarchical acceleration data structure including one or more primitives of a scene object; sort two or more nodes included in a same level of the hierarchical acceleration data structure into a sort order based on a sorting parameter value determined for each respective node of the two or more nodes, wherein the sorting parameter value is associated with a probability of determining a ray-opaque primitive intersection for each respective node of the two or more nodes; and determine an intersection between a shadow ray and an opaque primitive included in a node of the two or more nodes based on traversing the hierarchical acceleration data structure using the sort order.

In another example, an apparatus for ray tracing is provided. The apparatus includes: means for obtaining a hierarchical acceleration data structure, the hierarchical acceleration data structure including one or more primitives of a scene object; means for sorting two or more nodes included in a same level of the hierarchical acceleration data structure into a sort order based on a sorting parameter value determined for each respective node of the two or more nodes, wherein the sorting parameter value is associated with a probability of determining a ray-opaque primitive intersection for each respective node of the two or more nodes; and means for determining an intersection between a shadow ray and an opaque primitive included in a node of the two or more nodes based on traversing the hierarchical acceleration data structure using the sort order.

In some aspects, one or more of the apparatuses described above is or is part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 7 is a flow diagram illustrating an example of a process for graphics processing, in accordance with some examples of the present disclosure.

DETAILED DESCRIPTION

Figure 1A:
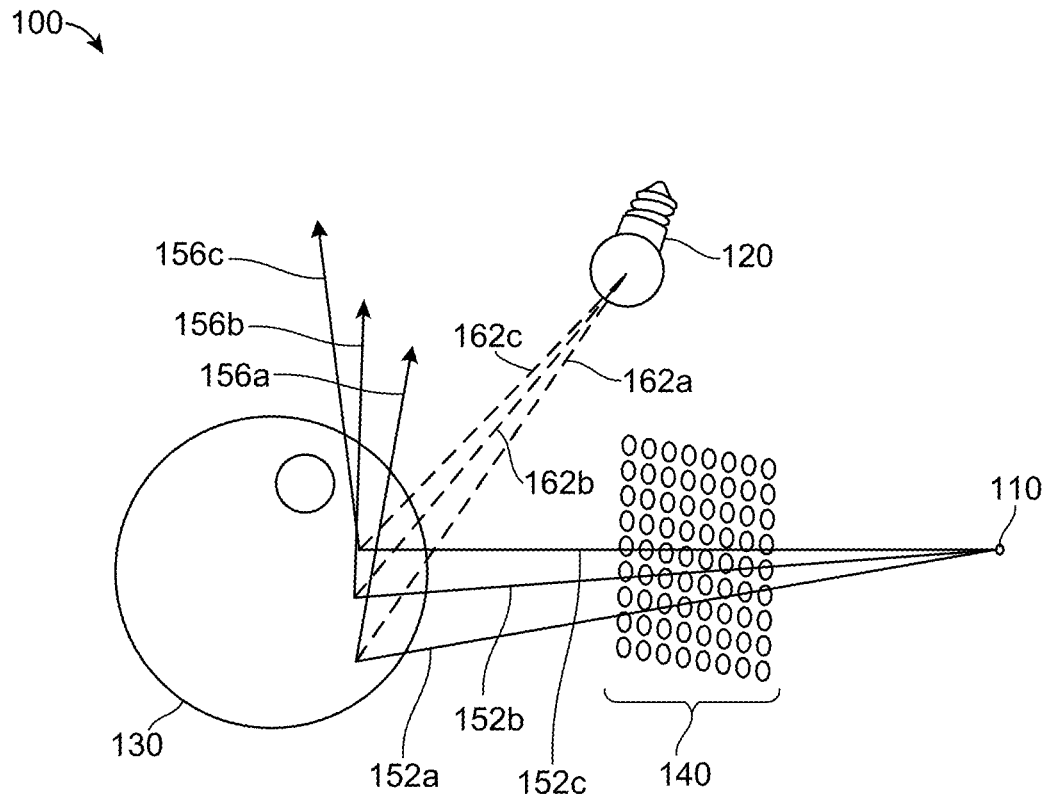
FIG. 1A illustrates an example of a ray tracing process, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Ray tracing is a graphics processing and rendering technique that can be used to produce photorealistic images by modeling light transport to simulate optical effects. Ray tracing can realistically simulate the lighting of a three-dimensional (3D) scene and its objects by rendering physically correct reflections, refractions, shadows, and/or indirect lighting in the two-dimensional (2D) view of the scene.

Ray tracing can be a computationally intensive technique. For example, the computational resources (e.g., compute time) used to ray trace a single frame can increase with the number of rays that are traced per frame and/or can increase with the computational resources (e.g., compute time) expended to trace each individual ray. Due to this computational complexity, ray tracing may often be limited to non-real time uses. Real-time ray tracing has long been sought after for uses such as rendering video games, virtual reality (VR) and augmented reality (AR) experiences, etc. Real-time ray tracing has recently become possible, using, for example, hardware acceleration units and/or graphics processing units (GPUs) that can provide parallelization of the underlying calculations for each individual ray that is projected into a scene.

The number of rays that can be projected into a scene for each frame is often relatively small, as the rendering time per frame cannot exceed some maximum amount without losing real-time performance. The image quality when using real-time ray tracing can be improved by increasing the number of rays projected into the scene per frame. For example, the number of rays projected into the scene per frame can be increased by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance (e.g., image quality) of existing ray tracing hardware is desirable.

Systems, apparatuses, processes (also referred to as methods), and computer readable media (collectively referred to as "systems and techniques") are described herein that can provide accelerated ray tracing operations for shadow ray intersection testing. For example, as described in more detail herein, the systems and techniques can increase a number of rays projected into a scene per frame by tracing each ray more efficiently (e.g., reducing the compute time per ray trace operation allows more ray trace operations to be performed in the same fixed rendering time per frame).

Various aspects of the application will be described with respect to the figures.

FIG. 1A is a diagram illustrating an example of a ray tracing technique 100. As illustrated, a ray tracing system can perform ray tracing by casting a plurality of rays (e.g., ray 152*a*, ray 152*b*, and ray 152*c*) from a virtual or imaginary view camera 110 (e.g., which determines the view into the 3D scene), through the pixels 140 of a 2D viewing plane, out into the 3D scene. In some examples, the rays 152*a-c* may also be referred to as "primary rays." Each primary ray can pass through a particular one of the pixels 140 (e.g., as illustrated in FIG. 1A). In some cases, each primary ray can pass through a different one of the pixels 140 when rendering a 3D scene. Multiple rays may also be used for some (or all) of the pixels 140. After casting one or more of the primary rays 152*a-c*, a ray tracing system can then trace the path of each primary ray to determine if the ray reaches back to a light source 120 in the 3D scene. Multiple different primary rays can be processed in parallel (e.g., because primary rays interact with various objects, surfaces, light sources, etc., in the 3D scene, but do not interact with other primary rays).

In the example of ray tracing technique 100, each primary ray 152a-c originates from the virtual or imaginary view camera 110 (e.g., sharing a common origin) and is projected through a particular pixel of the plurality of pixels 140 that are located on the 2D viewing plane (e.g., as described above). In the event a particular one of the primary rays 152a-c reaches a light source (e.g., light source 120) in the 3D scene, then information from that ray may be used to contribute to the final color and/or illumination level of the pixel (e.g., from the pixels 140) through which the particular ray was projected.

For example, when rays projected into the scene intersect with one or more objects (e.g., such as object 130), color and lighting information from the point(s) of intersection on the object(s) surfaces can contribute to the final colors and illumination levels of the pixels (e.g., pixels 140) associated with the rays (e.g., primary rays 152a-c). The color and lighting information can be determined based on whether the ray-object intersection point is directly illuminated by a light source (e.g., light source 120) or occluded (e.g., shadowed). Color and lighting information for a ray-object intersection point can be determined by projecting one or more shadow rays from the ray-object intersection point to the light sources within the scene, as will be described in greater depth below. If a shadow ray does not intersect an object on its way to the light source, then the ray-object intersection (e.g., also referred to as a "hit point") is illuminated. If the shadow ray does intersect with another object, then the hit point may be occluded (e.g., the object intersected by the shadow ray can cast a shadow on the hit point). Similarly, different objects can have different surface properties that reflect, refract, and/or absorb light in different ways, which can also contribute to the final pixel colors and/or illumination level. Rays can also reflect off of objects and hit other objects in the scene, or travel through the surfaces of transparent objects, etc., before reaching a light source (e.g., light source 120).

For example, as illustrated in FIG. 1A, a first primary ray 152a is projected into the scene and intersects object 130, resulting in the generation of a first shadow ray 162a. First shadow ray 162a is projected between the hit point (e.g., where first primary ray 152a intersects object 130) and light source 120, and may be used to determine whether the hit point between first primary ray 152a and object 130 is directly illuminated by light source 120 or shadowed by an additional scene object. As illustrated, first shadow ray 162a reaches light source 120 and consequently, can contribute color or illumination information for rendering the particular one of the pixels 140 through which first primary ray 152 was projected. The intersection (e.g., hit point) between first primary ray 152a and object 130 may also be used to generate one or more reflection rays, such as the first reflection ray 156a depicted in FIG. 1A. First reflection ray 156a does not reach light source 120, and consequently, may not directly contribute color or illumination information back to the pixels 140. In some cases, first reflection ray 156a may intersect with additional scene objects (not shown) and can contribute color and/or illumination information for these additional intersection points between the reflection ray and one or more additional scene objects. A same or similar scenario is illustrated for second primary ray 152b and the associated second shadow ray 162b (e.g., which reaches light source 120) and second reflection ray 156b (e.g., which does not reach light source 120), as well as for third primary ray 152c and the associated third shadow ray 162c (e.g., which reaches light source 120) and third reflection ray 156c (e.g., which does not reach light source 120).

Figure 1B:
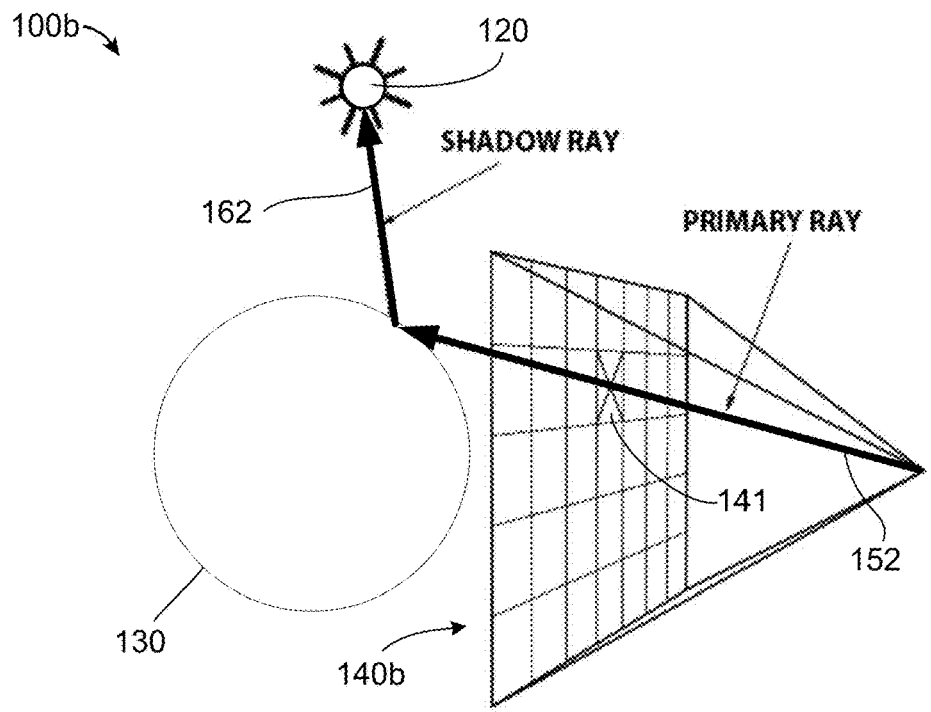
FIG. 1B illustrates an example of a ray tracing process including one or more shadow rays, in accordance with some examples.

FIG. 1B is a diagram illustrating another example of a ray tracing process 100b. Here, a primary ray 152 is projected through a grid of pixels 140b and into a scene that includes object 130. For example, primary ray 152 is projected from an origin/viewpoint, through a particular pixel 141 (e.g., included in the grid of pixels 140b), and intersects with object 130. The hit point or ray-object intersection between primary ray 152 and object 130 is then used as the origin for generating and projecting a shadow ray 162. As described above, shadow ray 162 can be projected from the hit point to the light source 120. As depicted in FIG. 1B, shadow ray 162 reaches light source 120 without intersecting any other object or scene primitive, and lighting and color information can be determined for pixel 141 based on the hit point being directly illuminated by light source 120.

Figure 1C:
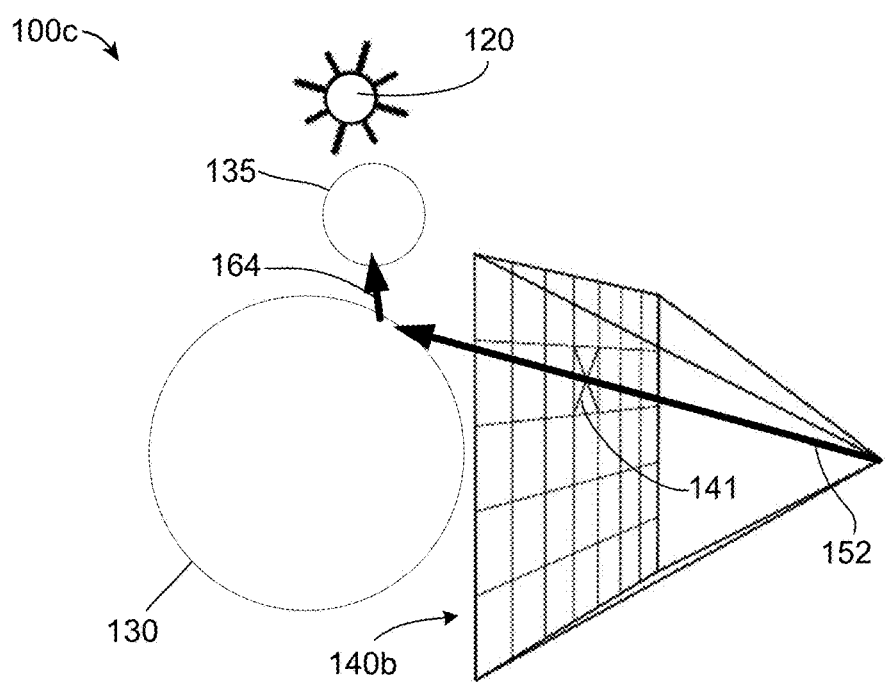
FIG. 1C illustrates an example of a ray tracing process including one or more occluded shadow rays, in accordance with some examples.

FIG. 1C is a diagram illustrating another example of a ray tracing process 100c. The diagram of FIG. 1C is the same as that of FIG. 1B, with the addition of an additional object 135 (e.g., an additional scene primitive) that lies along the direct path between the hit point (e.g., where primary ray 152 and object 130 intersect) and the light source 120. Here, when a shadow ray 164 is generated and projected from the hit point to the light source 120, shadow ray 164 intersects with additional object 135 and does not reach light source 120. Because shadow ray 164 does not reach light source 120, the hit point may be considered occluded or shadowed by the additional object 135. For example, based on the intersection between shadow ray 164 and additional object 135, lighting and color information can be determined for pixel 141 based on the hit point being occluded or shadowed (e.g., occluded or shadowed with respect to the light source 120). In some examples, after generating and projecting a shadow ray in response to determining a hit point between a primary ray and a scene object/primitive, processing for the shadow ray can be terminated when the shadow ray intersects with the light source or another scene primitive (e.g., whichever comes first).

As mentioned previously, each interaction between a ray and an object (e.g., scene object, primitive, surface within the 3D scene, etc.) can contribute color and/or illumination information back to the particular pixel through which a primary ray was projected. In some cases, tracing a greater number of interactions per ray can provide increased visual fidelity (e.g., quality) of the rendered scene at the expense of increased computational cost (e.g., time). For example, a ray tracing approach that prioritizes speed over quality might calculate or otherwise determine only the first reflection for each ray, while a ray tracing approach that prioritizes quality over speed might determine three or more reflections per ray. In some cases, after observing either a maximum number of reflections or a ray traveling a certain distance without intersection, the ray can cease to travel and the pixel's value can be updated. In some cases, the ray can cease to travel and the pixel's value can be updated based on a ray traveling a certain distance without reflection (e.g., reflection being one possible outcome of an intersection). In some cases, the number of rays that are projected through each pixel of the 2D viewing plane can be adjusted based on a similar tradeoff between computational cost and visual fidelity.

Ray tracing can therefore become very costly in terms of the time and/or computational power that is required to render realistic-looking scenes, based, for example, on the number of rays projected into the scene and the number of additional rays that are traced for secondary reflections and refractions. Due to this computational complexity, ray tracing is typically limited to non-real time uses (e.g., scenes or visual effects that could be rendered in advance for film and television). Real-time ray tracing has long been sought after for use cases such as rendering video games, virtual reality (VR) and augmented reality (AR) experiences, etc.

Real-time ray tracing has recently become possible and is often performed by hardware acceleration units and/or graphics processing units (GPUs) that can provide parallelization of the underlying calculations for each individual ray that is projected into the scene. The number of rays that can be projected into the scene for each frame is often relatively small, as the rendering time per frame cannot exceed some maximum amount without losing real-time performance.

The image quality when using real-time ray tracing can be improved by increasing the number of rays projected into the scene per frame. This can be achieved by increased parallelization (e.g., providing additional computational resources that allow more rays to be traced simultaneously). However, hardware upgrades can carry high upfront costs and may be difficult or impossible to retrofit onto existing systems and platforms. A scalable and efficient solution that can improve the real-time performance of existing ray tracing hardware is desirable. For example, the number of rays projected into the scene per frame can also be increased by tracing each ray more efficiently (e.g., reducing the compute time per ray trace operation allows more ray trace operations to be performed in the same fixed rendering time per frame).

One example of a ray tracing acceleration technique utilizes tree-based acceleration structures to improve the efficiency of ray intersection tests (e.g., also referred to as "collision tests" and/or "hit tests") and/or other ray tracing operations. For example, a ray intersection test can include, but is not limited to, determining whether a primary ray intersects with one or more scene objects or primitives (e.g., after the primary ray is projected into the scene); determining whether a shadow ray intersects with an additional scene object or primitive (e.g., after the shadow ray is projected from a primary ray hit point to a light source); and determining whether a reflection ray intersects with an additional scene object or primitive (e.g., after the reflection ray is projected from a hit point, using a calculated reflection angle).

Figure 2A:
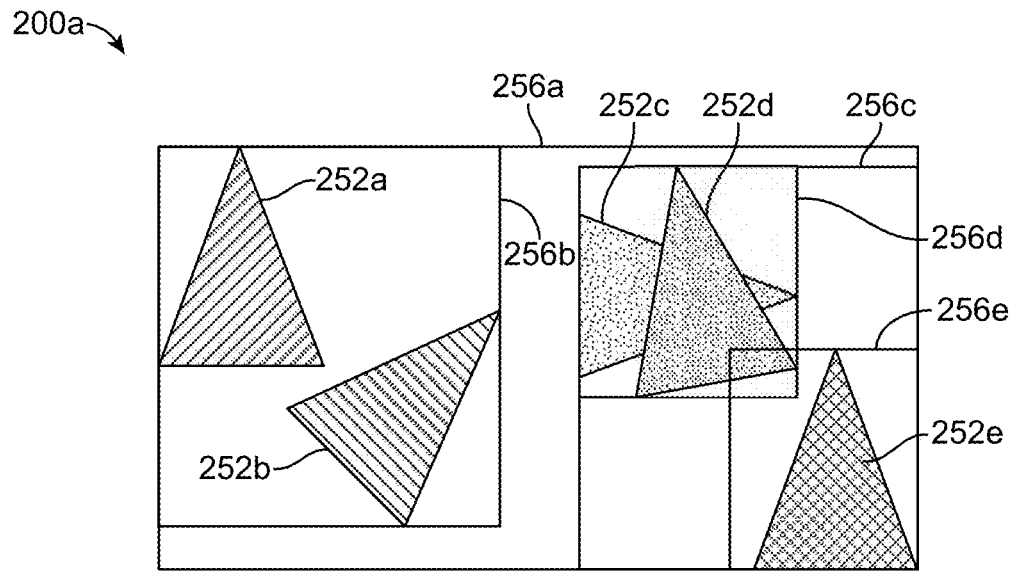
FIG. 2A illustrates an example of bounding volumes including one or more primitives representing portions of surfaces in a scene, in accordance with some examples.
Figure 2B:
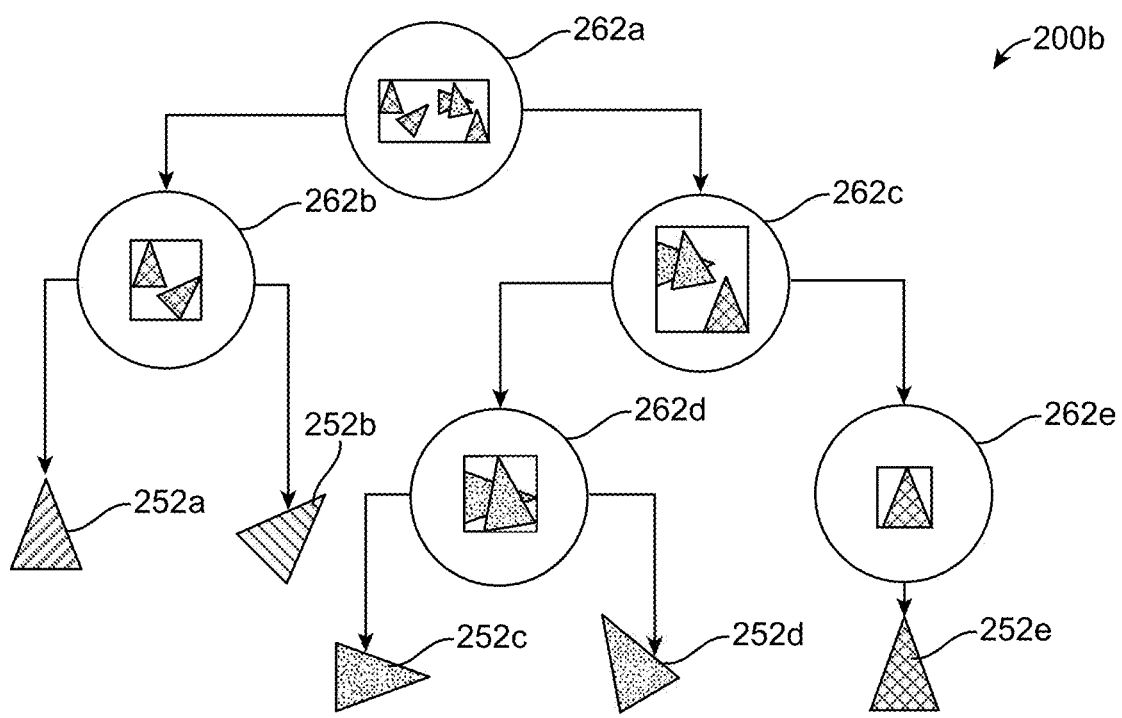
FIG. 2B illustrates an example of abounding volume hierarchy (BVH) organizing the bounding volumes of FIG. 2A, in accordance with some examples.

Scenes can be converted into bounding volume hierarchies (BVHs), which are hierarchical tree structures composed of ever-tighter bounding volumes (also referred to as "bounding regions" such as bounding boxes or "axis-aligned bounding boxes" (AABBs)). For example, FIG. 2A illustrates an example in which a scene 200a containing a plurality of triangle primitives 252a-252e is arranged into a series of ever-tighter bounding boxes 256a-256e. Scenes may contain hundreds, thousands, or more primitives, but for purposes of clarity, only the five triangle primitives 252a-252e are depicted. The bounding boxes 256a-256e can be AABBs, which are bounding boxes having a minimized area or volume within which all points of the enclosed primitives (e.g., triangle primitives 252a-252e) may lie. The bounding boxes may be axis-aligned such that the edges of each bounding box 256a-256e are parallel to a coordinate axis (e.g., the x, y, and z axes). FIG. 2B illustrates an example hierarchical data structure 200b having nodes that are associated with the bounding boxes 256a-256e and triangle primitives 252a-252e shown in FIG. 2A. The hierarchical data structure 200b can be a BVH. For example, a BVH root node 262a can correspond to the bounding box 256a shown in FIG. 2A; similarly, an intermediate BVH node 262b can correspond to the bounding box 256b of FIG. 2A; intermediate BVH node 262c can correspond to the bounding box 256c of FIG. 2A, and so on.

A BVH root node (e.g., BVH root node 262a of FIG. 2B) contains an AABB (e.g., bounding box 256a of FIG. 2A) enclosing all the individual scene or object geometry contained in the BVH leaf nodes. Each primitive in the BVH root node is assigned to either the left or right child node. The child nodes contain the AABBs containing their assigned geometry, and this geometry is likewise assigned to left or right child nodes, recursively until the BVH leaf nodes contain a small number of primitives, e.g., four or fewer. Depending on the extent of any scene changes and/or object deformations, the next and any subsequent frames may require one or more new BVH build operations or BVH refitting/update operations based on the scene changes.

As mentioned previously, testing each ray for intersection against every primitive in the scene can be inefficient and computationally expensive. BVHs can be used to accelerate ray intersection testing techniques, among other ray tracing operations. For example, BVHs can be used for efficient traversal during the processing of collision checks associated with primary rays, shadow rays, reflection rays, etc. Each ray can be tested for intersection against BVH bounding boxes (e.g., using a depth-first tree traversal process) instead of being tested against every primitive in the scene. As mentioned previously, bounding boxes encompass or surround different amounts of scene geometry or primitives and become increasingly tighter with the depth of the BVH tree structure.

Figure 3A:
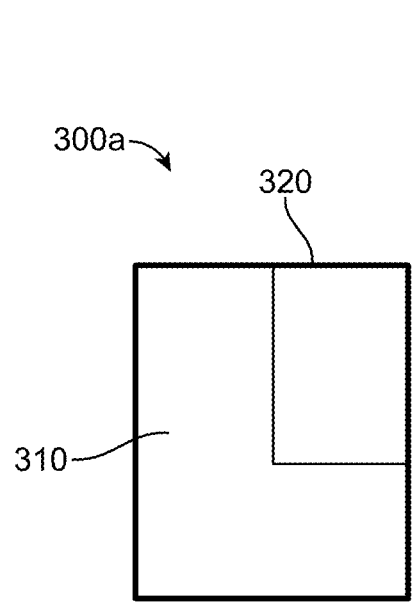
FIG. 3A illustrates an example of a scene object and an object-space bounding volume enclosing the scene object, in accordance with some examples.
Figure 3B:
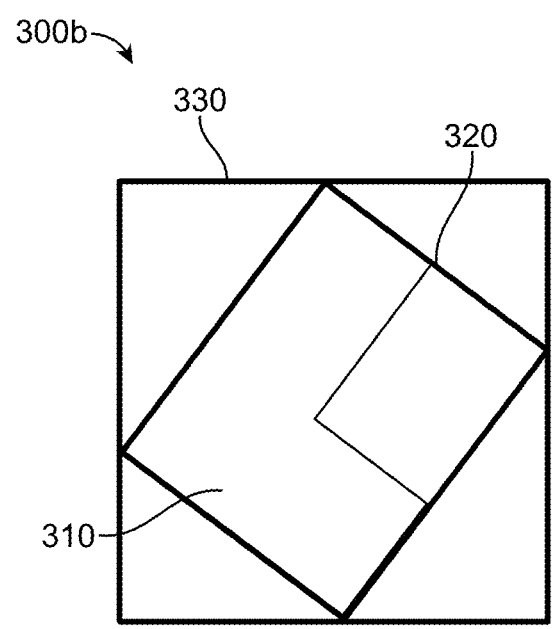
FIG. 3B illustrates an example of a world-space bounding volume enclosing the object-space bounding volume and scene object of FIG. 3A, in accordance with some examples.

Bounding boxes (e.g., AABBs or other bounding boxes) or other bounding regions can be defined with respect to world-space or object-space. World-space can be considered a constant (e.g., the coordinate space of the overall 3D scene). Objects can exist in their own coordinate space, which is referred to as object-space (e.g., the coordinate space in which the object was modeled or created). For example, FIGS. 3A and 3B are diagrams depicting object-space and world-space AABBs (axis-aligned bounding boxes) for the same geometry. Here, FIG. 3A illustrates an object-space AABB 320 of a geometric scene object 310. Scene objects can include the 3D or graphical objects that are present in a 3D scene for which ray tracing is performed. In some cases, geometric scene objects can be scene objects that include geometric primitives such as triangles. In some examples, scene objects can include AABBs or other object representations. Object-space AABB 320 and scene object 310 are both shown in the object-space 300a of the scene object 310. FIG. 3B illustrates the same geometric scene object 310 but transformed into the world-space 300b of the scene (e.g., the scene to which scene object 310 belongs or is located). A world-space AABB 330 encloses both the object-space AABB 320 and the scene object 310.

Figure 4A:
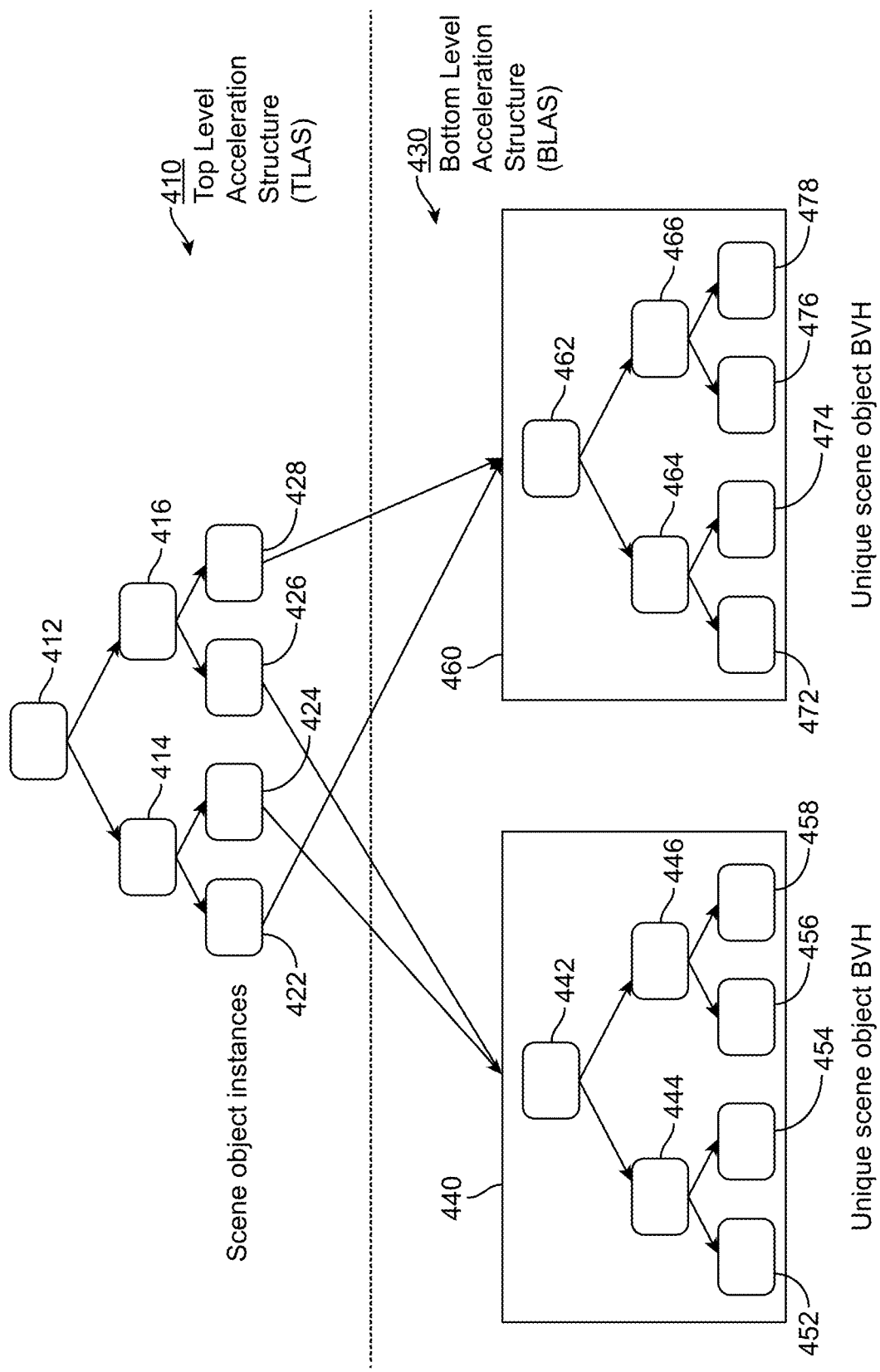
FIG. 4A illustrates an example of an acceleration data structure including a top-level acceleration structure (TLAS) and a bottom-level acceleration structure (BLAS), in accordance with some examples.

Ray tracing can utilize a two-level acceleration structure system, such as a top-level acceleration structure (TLAS) and a bottom-level acceleration structure (BLAS), as depicted in FIG. 4A. For example, FIG. 4A illustrates a TLAS 410 and a BLAS 430, which are described in greater depth below.

The TLAS 410 is built in world-space. TLAS primitives are instances of BLASs, which are defined in object-space. A TLAS can be constructed as a BVH with leaf nodes containing a BLAS. For example, the TLAS leaf nodes 422, 424, 426, and 428 each contain or are otherwise associated with one of the two BLASs 440 and 460. A translation matrix can be encoded in the TLAS leaf node to perform conversion from world-space to object-space and/or vice versa, as described in greater depth below.

A BLAS can be constructed for each object in a scene, referred to as a scene object. For example, FIG. 4A illustrates a BLAS 440 that may be constructed for a first unique scene object and a BLAS 460 that may be constructed for a second unique scene object. BLAS primitives can be the triangles or the AABBs of procedural primitives used to build the scene object. A bottom level BVH is built over the set of these triangles or AABBs of the scene object, with each BLAS leaf node containing a small number (e.g., up to four, five, or some other number) of triangles or AABBs. For example, in the context of FIG. 4A, the BLAS leaf nodes 452-458 and 472-478 can each contain some quantity of triangles, AABBs, or other primitives used to build the scene object. In some examples, a BLAS can also be referred to as a "bottom level BVH." Multiple instances of the same BLAS can be included in a TLAS. For example, if a TLAS includes a car object, then a BLAS of a tire can be included four times. The same BLAS can also be included in or referenced by multiple TLASs, as illustrated in FIG. 4A.

In some examples, a TLAS can be created using an Object-To-World matrix, which transforms an input represented in object-space coordinates to an output representation in world-space coordinates. A World-To-Object matrix can apply the transformation in the opposite direction (e.g., transforming an input represented in world-space coordinates to an output representation in object-space coordinates). In some cases, a TLAS can be built over a set of BLASs by using the Object-To-World matrix to compute the world-space AABB of each BLAS (e.g., the world-space AABB of the BLAS root nodes 442 and 462). A BVH is then built over these world-space AABBs of the BLAS root nodes and can be referred to as a top level BVH or the TLAS 410. In some cases, TLAS and BLAS creation can be performed using a similar or identical technique. For example, the same SAH-based (Surface Area Heuristic) algorithm or approach can be utilized for both TLAS and BLAS construction.

Figure 4B:
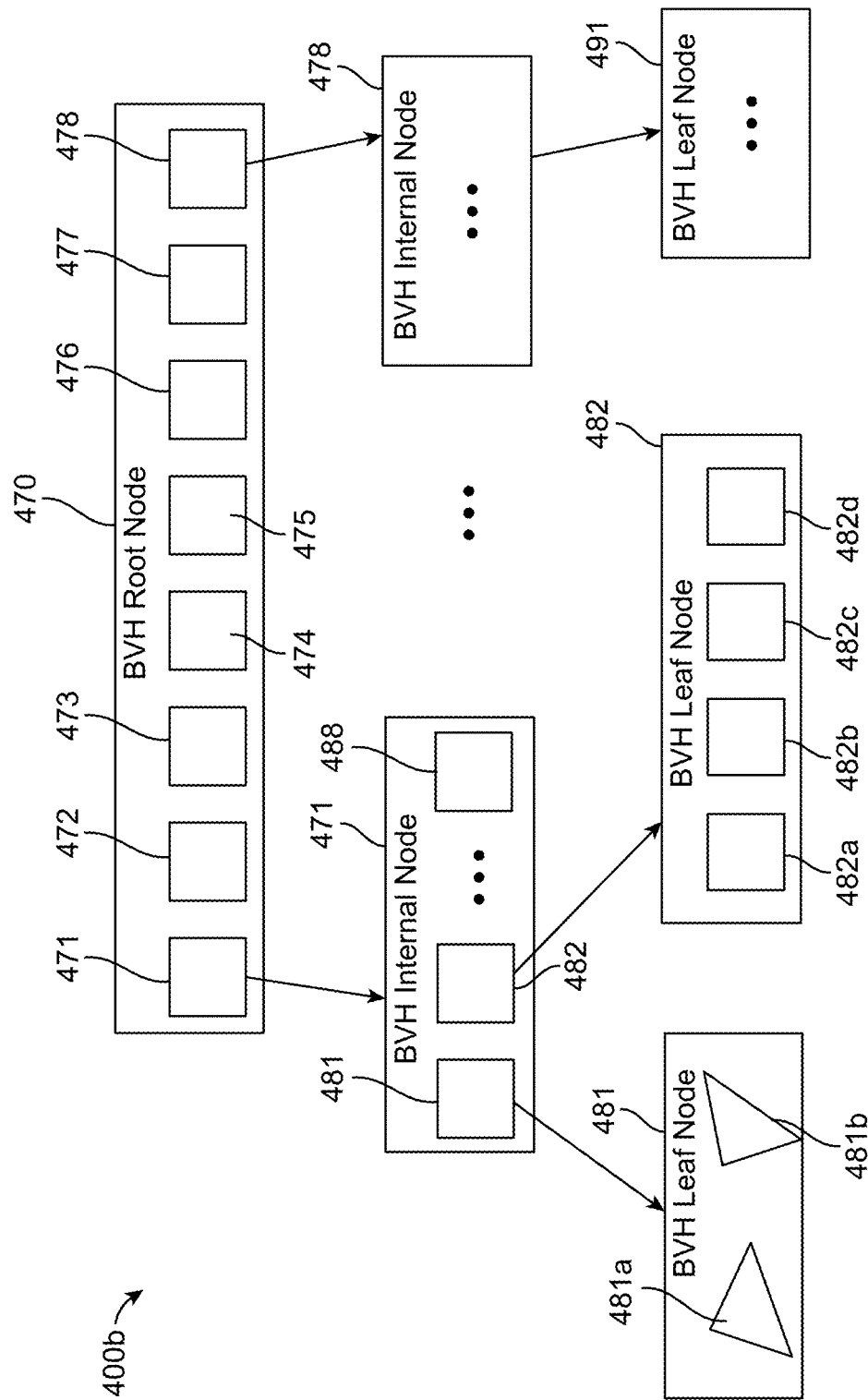
FIG. 4B illustrates an example of an acceleration data structure that includes leaf nodes containing triangles and leaf nodes containing bounding volumes, in accordance with some examples.

FIG. 4B is a diagram illustrating an example of an acceleration data structure 400b that includes or stores both triangles and bounding volumes. In some examples, acceleration data structure 400b can be a BVH (e.g., as is illustrated in FIG. 4B), although it is noted that other hierarchical tree structures and/or other acceleration data structures can also be utilized. As illustrated in FIG. 4B, acceleration data structure 400b (e.g., a BVH) includes a BVH root node 460 that includes a plurality of bounding volumes 471-478. The bounding volumes 471-478 can correspond to or otherwise be constructed for the child nodes of BVH root node 460. For instance, the eight bounding volumes 471-478 can be AABBs for eight corresponding child nodes of the BVH root node 460.

In the example of FIG. 4B, the acceleration data structure 400b has a branching factor of eight. The branching factor of an acceleration data structure is the maximum number of child nodes that may be associated with or contained by any parent node within the acceleration data structure. The number of child nodes associated with some internal nodes can be less than the branching factor. For example, acceleration data structure 400b has a branching factor of eight, but some internal nodes within acceleration data structure 400b may have less than eight child nodes. It is noted that a larger or smaller branching factor can also be used to generate an acceleration structure such as the acceleration data structure 400b. In cases where acceleration data structure 400b uses a larger or smaller branching factor, the BVH root node 460 and/or the BVH internal nodes (e.g., shown here as BVH internal nodes 471-478) can likewise include a greater or lesser number of bounding volumes or AABBs.

As mentioned above, BVH root node 460 includes AABBs for its eight child nodes 471-478. In some examples, the AABBs for child nodes 471-478 can be stored in the data structure of BVH 400b (e.g., included in the data representation of the parent node). For instance, the BVH root node 460 can include indices to data storage or memory locations where one or more of its child nodes 471-478 can be obtained or retrieved. In one illustrative example, the BVH root node 460 includes an index to only the first child node (e.g., the BVH internal node 471), with the remaining child nodes (e.g., nodes 472-478) stored adjacent to the memory index of the first child node 471.

Child node 471 is depicted in FIG. 4B as a BVH internal node 471, as node 471 is neither a root nor a leaf of BVH 400b. Internal nodes of BVH 400b (e.g., such as node 471) can have a number of child nodes that is lesser than or equal to the branching factor, which for BVH 400b is eight. In some examples, internal BVH nodes (e.g., such as node 471) can contain a bounding volume or AABB for each of their child nodes, as previously described above with respect to the BVH root node 460. BVH internal node 471 contains a plurality of bounding volumes 481-488, which in this case represent the eight child nodes of internal node 471. As illustrated in FIG. 4B, the child nodes of internal node 471 are BVH leaf nodes (e.g., leaf nodes of the BVH acceleration data structure 400b).

For example, the child nodes of internal node 471 include BVH leaf node 481 and BVH leaf node 482 (internal node 471 includes additional child nodes 483-488, which are omitted from the leaf node layer of FIG. 4B for clarity). As illustrated, BVH leaf node 481 includes two triangles 481a and 481b, which are geometric primitives that can be used to build a scene object or model represented by the BVH 400b. In some cases, the triangles 481a-481b can be enclosed by the corresponding AABB that is stored in internal node 471 for the BVH leaf node 481. In one illustrative example, the coordinates of the triangles 481a-481b can be stored directly in the underlying data structure of BVH 400b rather than being retrieved from an external data store or data location. For example, the coordinates (e.g., vertices) of triangles 481a-481b can be stored in the BVH leaf node 481 itself.

FIG. 4B depicts BVH leaf node 482 as including four bounding volumes (e.g., AABBs) 482a, 482b, 482c and 482d. In one illustrative example, the bounding volumes 482a-482d can be AABBs of procedural primitives (e.g., representing spheres or other user-defined shapes). In some examples, the bounding volumes 482a-482d can be AABBs of instances of BVHs. As was described above with respect to the BVH leaf node 481, it is noted that the four bounding volumes 482a-482d can be enclosed by the corresponding AABB that is stored in internal node 471 for the BVH leaf node 472. Although FIG. 4B depicts the BVH internal node 471 as including child nodes that contain triangles (e.g., BVH leaf node 481) and child nodes that contain bounding volumes (e.g., BVH leaf node 482), in some examples the BVH acceleration data structure 400b as a whole may include only leaf nodes that contain triangles or may include only leaf nodes that contain bounding volumes.

As mentioned previously, a BVH can store scene geometry (e.g., primitives) in a hierarchical grouping structure that can be used to accelerate the process of ray tracing by improving the efficiency of ray intersection tests. In some aspects, the same BVH may be used to perform ray intersection tests for primary rays (e.g., testing a primary ray for intersection with one or more primitives) and to perform ray intersection tests for shadow rays (e.g., testing a shadow ray for intersection with a light source or any opaque primitive included in the scene). Primary ray intersection tests can be performed based on a depth-first traversal of the BVH and/or other traversal techniques in which BVH nodes that are closer to the virtual camera (e.g., the origin of the primary ray(s)) are traversed first. In some cases, primary ray BVH traversal can be terminated after observing a maximum number of intersections and/or reflections associated with the primary ray. Primary ray BVH traversal may additionally, or alternatively, be terminated based on the primary ray traveling a certain distance without intersection.

In what may also be referred to as "shadow ray early termination," shadow ray BVH traversal can be terminated once the shadow ray either intersects any opaque primitive included in the scene, or once the shadow ray intersects the corresponding light source for which it was generated. In some examples, the efficiency and/or performance of shadow ray collision tests can decrease when shadow ray BVH traversal is also performed based on visiting BVH nodes based on distance from the virtual camera (e.g., when using the same BVH traversal technique as in primary ray intersection tests). There is a need for systems and techniques that can be perform shadow ray intersection testing with improved BVH traversal efficiency.

As noted above, systems and techniques are described herein that can provide accelerated ray tracing operations for shadow ray intersection testing. For example, the systems and techniques can be used to perform shadow ray intersection testing with improved BVH traversal efficiency. In one illustrative example, the systems and techniques can perform shadow ray BVH traversal by prioritizing visits to BVH nodes that may provide a shadow-ray primitive intersection more quickly. For example, a shadow ray intersection test, and therefore, shadow ray BVH traversal, can be terminated in response to the shadow ray reaching (e.g., intersecting) the light source towards which the shadow ray was projected. However, a shadow ray intersection test/BVH traversal can also be terminated in response to the shadow ray intersecting any opaque primitive in the scene (e.g., shadow ray early termination).

Figure 5:
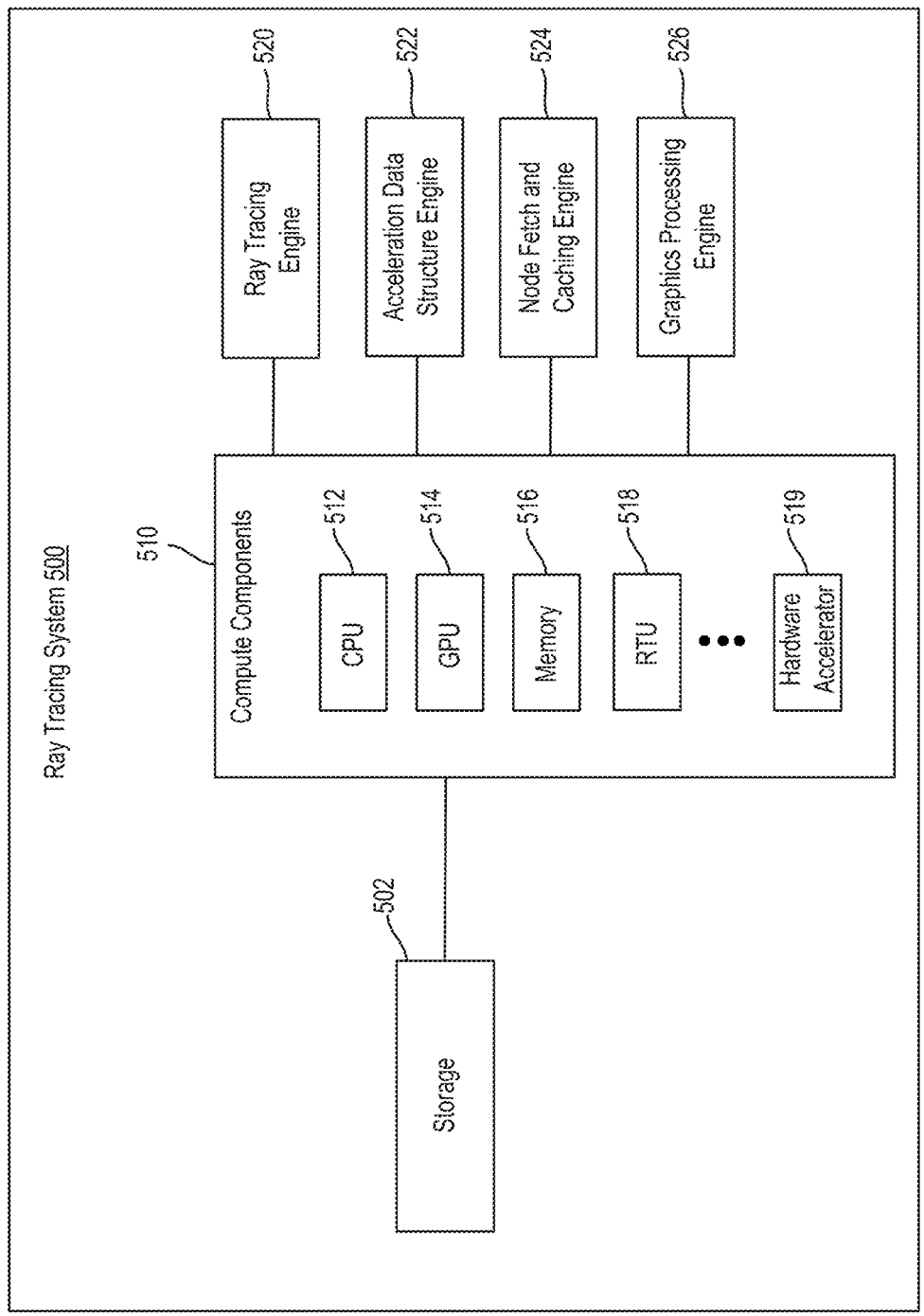
FIG. 5 is a simplified block diagram illustrating an example ray tracing system, in accordance with some examples of the present disclosure.

FIG. 5 is a diagram illustrating an example ray tracing system 500, in accordance with some examples of the disclosure. The ray tracing system 500 can implement the systems and techniques disclosed herein, including aspects described above and aspects associated with FIGS. 6A-7. The ray tracing system 500 can perform various tasks and operations such as, for example, ray tracing tasks and operations (e.g., ray-primitive intersection, ray-bounding volume intersection, ray-triangle intersection, ray-AABB intersection, acceleration data structure construction and/or updating, rendering, etc.).

In the example shown in FIG. 5, the ray tracing system 500 includes storage 502, compute components 510, a ray tracing engine 520, an acceleration data structure engine 522, a node fetch and caching engine 524, and a graphics processing engine 526. It should be noted that the components 502 through 526 shown in FIG. 5 are non-limiting examples provided for illustration and explanation purposes, and other examples can include more, less, and/or different components than those shown in FIG. 5. For example, in some cases the ray tracing system 500 can include one or more display devices, one more other processing engines, one or more other hardware components, and/or one or more other software and/or hardware components that are not shown in FIG. 5. An example architecture and example hardware components that can be implemented by the ray tracing system 500 are further described below with respect to FIG. 8.

References to any of the components of the ray tracing system 500 in the singular or plural form should not be interpreted as limiting the number of such components implemented by the ray tracing system 500 to one or more than one. For example, references to a processor in the singular form should not be interpreted as limiting the number of processors implemented by the ray tracing system 500 to one. One of ordinary skill in the art will recognize that, for any of the components shown in FIG. 5, the ray tracing system 500 can include only one of such component(s) or more than one of such component(s).

The ray tracing system 500 can be part of, or implemented by, a single computing device or multiple computing devices. In some examples, the ray tracing system 500 can be part of an electronic device (or devices) such as a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, an extended reality (XR) device (e.g., a VR headset or had-mounted display (HMD), an AR headset, HMD, or glasses, etc.), or any other suitable electronic device(s).

In some implementations, the storage 502, compute components 510, ray tracing engine 520, acceleration data structure engine 522, node fetch and caching engine 524, and graphics processing engine 526 can be part of the same computing device. For example, in some cases, the storage 608, compute components 510, ray tracing engine 520, acceleration data structure engine 522, and graphics processing engine 526 can be integrated into a smartphone, laptop, tablet computer, smart wearable device, gaming system, and/or any other computing device. In other implementations, the storage 502, compute components 510, ray tracing engine 520, acceleration data structure engine 522, and graphics processing engine 526 can be part of two or more separate computing devices. For example, in some cases, some of the components 502 through 526 can be part of, or implemented by, one computing device and the remaining components can be part of, or implemented by, one or more other computing devices.

The storage 502 can be any storage device(s) for storing data. Moreover, the storage 502 can store data from any of the components of the ray tracing system 500. For example, the storage 502 can store data from the compute components 510, data from the ray tracing engine 520, data from the acceleration data structure engine 522, data from the node fetch and caching engine 524, and/or data from the graphics processing engine 526. In some examples, the storage 502 can include one or more buffers and/or caches for storing data for processing by the compute components 510. In some examples, the one or more buffers and/or caches can be general-use and available to some (or all) of the compute components 510. In some examples, the one or more buffers and/or caches can be provided specific to particular ones of the compute components 510.

The compute components 510 can include a central processing unit (CPU) 512, a graphics processing unit (GPU) 514, a memory 516, a Ray Tracing Unit 518, and/or one or more hardware accelerator components 519. In some implementations, the compute components 510 can include other processors or compute components, such as one or more digital signal processors (DSPs), one or more neural processing units (NPUs), and/or other processors or compute components. The compute components 510 can perform various operations such as ray-primitive intersection, ray-bounding volume intersection, ray-AABB intersection, acceleration data structure construction, acceleration data structure updating, scene rendering, rasterization, geometry processing, pixel processing, visibility processing, etc.

The operations for the ray tracing engine 520, the acceleration data structure engine 522, the node fetch and caching engine 524, and the graphics processing engine 526 (and any other processing engines) can be implemented by any of the compute components 510. In some cases, the operations of one or more of the ray tracing engine 520, the acceleration data structure engine 522, the node fetch and caching engine 524, and the graphics processing engine 526 can be executed by the CPU 512. In one illustrative example, the operations of one or more of the ray tracing engine 520, the acceleration data structure engine 522, the node fetch and caching engine 524, and the graphics processing engine 526 can be executed by the GPU 514. In some cases, the operations of one or more of the ray tracing engine 520, the acceleration data structure engine 522, the node fetch and caching engine 524, and the graphics processing engine 526 can be executed by the RTU 518 and/or the one or more hardware accelerators 519.

In some cases, the operations of one or more of the ray tracing engine 520, the acceleration data structure engine 522, the node fetch and caching engine 524, and the graphics processing engine 526 can be executed by one or more combinations of CPU 512, GPU 514, RTU 518, and hardware accelerators 519. In some cases, the compute components 110 can include other electronic circuits or hardware, computer software, firmware, or any combination thereof, to perform any of the various operations described herein.

In some examples, the ray tracing engine 520 can include one or more ray tracing Application Programming Interfaces (APIs). In one example, the ray tracing engine 520 can include one or more ray intersection engines. For example, ray tracing engine 520 can include one or more ray-primitive intersection engines and/or can include one or more ray-bounding volume intersection engines. In some cases, ray tracing engine 520 can include one or more ray-triangle intersection engines and/or can include one or more ray-AABB intersection engines. In some examples, the ray tracing engine 520 can implement one or more ray intersection engines using one or more hardware-accelerated ray tracing units (RTUs) and/or arithmetic logic units (ALUs).

In one illustrative example, the ray tracing engine 520 can communicate with RTU 518 (and/or hardware accelerators 519) to perform ray-primitive (e.g., ray-triangle) intersections and/or ray-bounding volume (e.g., ray-AABB) intersections. For example, in some cases the ray tracing engine 520 can provide one or more inputs and/or control signals to RTU 518 (and/or hardware accelerators 519). RTU 518 (and/or hardware accelerators 519) can use the inputs and control signals from ray tracing engine 520 to perform ray-primitive intersections and/or ray-bounding volume intersections and can communicate the ray intersection results back to ray tracing engine 520.

In some examples, the acceleration data structure engine 522 can construct or generate one or more acceleration data structures. The acceleration data structures generated by acceleration data structure engine 522 can be used by one or more of ray tracing engine 520, the node fetch and caching engine 524, and graphics processing engine 526. In one illustrative example, acceleration data structure engine 522 can construct or generate a Bounding Volume Hierarchy (BVH). In some cases, acceleration data structure engine 522 can generate two-level acceleration structures (e.g., an acceleration data structure including a TLAS and one or more BLASs). The acceleration data structure engine 522 can be implemented using the CPU 512, the GPU 514, or a combination of the two. In some examples, the acceleration data structure engine 522 can additionally, or alternatively, be implemented using one or more of the dedicated hardware accelerator components 519.

In some examples, the graphics processing engine 526 can include a graphics processing pipeline. For example, graphics processing engine 526 can include, but is not limited to, one or more of a geometry processing stage, a visibility stage, a rasterization stage, and a pixel processing pipeline. In some examples, graphics processing engine 526 can communicate with or access the memory 516 of the compute components 510. Memory 516 can include one or more of a system memory, a frame buffer, a graphics memory, one or more caches, etc. In some examples, graphic processing engine 526 can communicate with one or more of the RTU 518 and/or hardware accelerators 519 (e.g., of the compute components 510) and/or the ray tracing engine 520.

In some cases, the ray tracing system 500 (e.g., using the ray tracing engine 520, the acceleration data structure engine 522, the node fetch and caching engine 524, and/or the graphics processing engine 526) can obtain an acceleration data structure that includes one or more primitives of a scene object. For example, the ray tracing system 500 can obtain the acceleration data structure from storage 502 and/or memory 516. In some cases, the acceleration data structure can be generated or constructed using the acceleration data structure engine 522.

The acceleration data structure engine 522 can obtain one or more representations of a scene object or other scene geometry and generate and/or update a BVH or other acceleration data structure that includes the scene object or scene geometry. In some examples, the acceleration data structure engine 522 can obtain representations of a scene object or other scene geometry at least in part from one or more of the storage 502 and the memory 516. In some cases, the acceleration data structure engine 522 can obtain representations of a scene object or other scene geometry from the ray tracing engine 520 (and/or one or more of the compute components 510).

The acceleration data structure engine 522 can operate over representations of scene objects and scene geometry using both object-space representations and world-space representations. In some examples, the acceleration data structure engine 522 can use one or more Object-To-World matrices and/or World-To-Object matrices to transform scene objects/geometry from object-space representations into world-space representations, and from world-space representations to object-space representations, respectively.

Figure 6A:
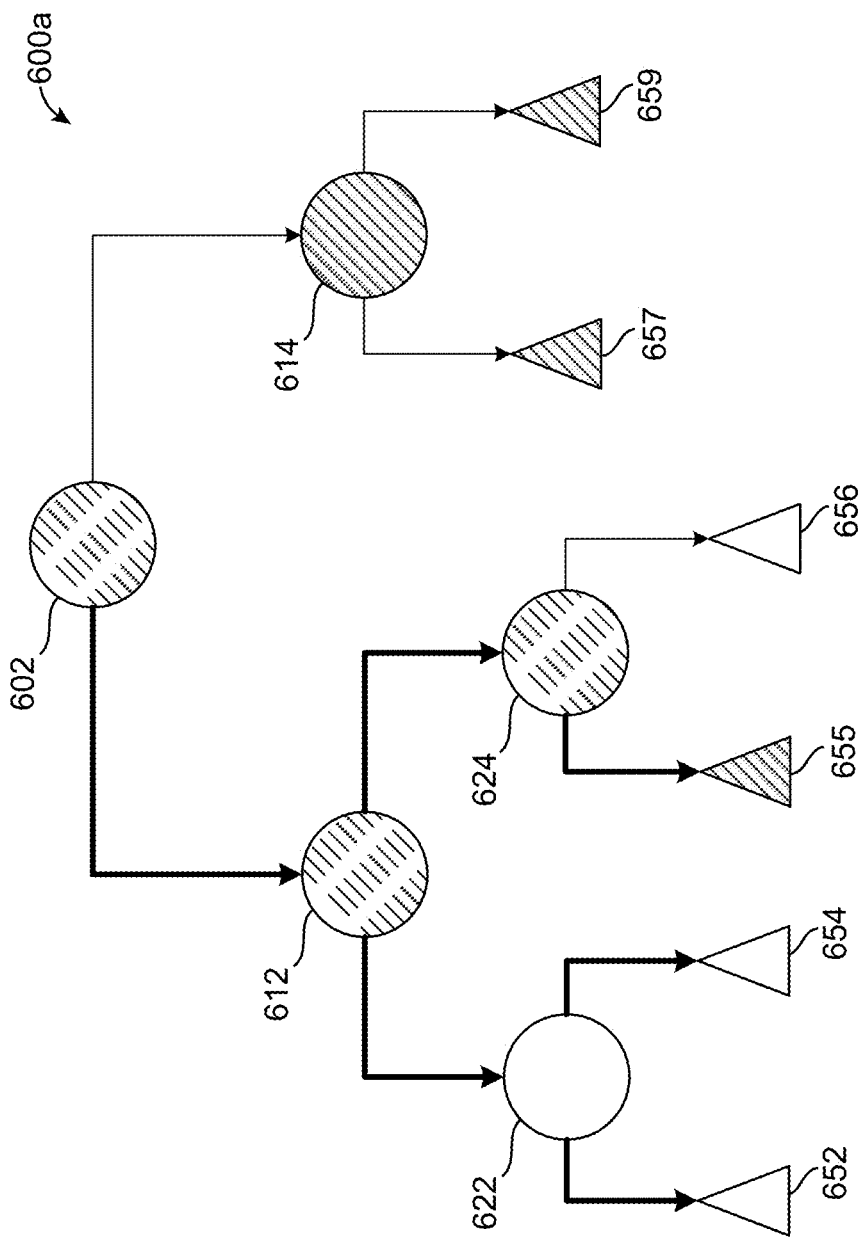
FIG. 6A illustrates an example of an acceleration data structure used for shadow ray intersection, in accordance with some examples of the present disclosure.

FIG. 6A depicts an example BVH 600a that can be traversed to perform a shadow ray intersection test. As illustrated, BVH 600a includes a root node 602, an internal node 612, and leaf nodes 614, 622, and 624, although other BVHs and/or other hierarchical tree-based acceleration data structures may also be utilized. For example, BVH 600a may include a larger or smaller quantity of internal nodes 612 and/or may include a larger or smaller quantity of leaf nodes 614, 622, 624. The BVH leaf nodes 614, 622, and 624 are depicted as each including two triangles (e.g., scene geometry or scene primitives). In some cases, one or more of the BVH leaf nodes 614, 622, 624 may additionally, or alternatively, include a larger or smaller quantity of primitives or other scene geometry. The BVH leaf nodes 614, 622,

624 may each include the same quantity and/or type of primitives. In some examples, the BVH leaf nodes 614, 622, 624 can include different quantities and/or types of primitives.

As mentioned previously, a shadow ray intersection test can be performed based on a previously determined intersection point (e.g., a hit point) between a primary ray and a scene primitive. In some aspects, a shadow ray intersection test can be performed based on traversing a BVH (e.g., such as BVH 600*a*) to determine an intersection point in the 3D scene that is associated with the projected shadow ray. For example, the shadow ray intersection test can be performed based on generating and projecting a shadow ray from the hit point to a light source in the scene and determining whether the shadow ray intersects an opaque scene primitive or reaches the light source. Based on a determination that the projected shadow ray reaches the light source, the hit point (e.g., the scene primitive previously intersected by a primary ray and used as the origin from which the shadow ray was projected) can be identified as directly illuminated by the light source. Based on a determination that the shadow ray does not reach the light source, the hit point can be identified as occluded or shadowed with respect to the light source.

As previously described above, a shadow ray intersection test can be terminated once the shadow ray either intersects with the light source or intersects with an opaque scene primitive (e.g., also referred to as "shadow ray early termination," as described previously). When a shadow ray intersection test exits via early termination, the path of the shadow ray is not projected beyond the intersection point between the shadow ray and the opaque primitive. For example, a shadow ray may not reach the light source towards which it was projected if the path of the shadow ray intersects with at least one opaque scene primitive (e.g., a scene can include multiple primitives in the path of a projected shadow ray, and it may be unnecessary to determine whether more than one shadow ray-primitive intersection exists).

In some cases, the shadow ray intersection test may ignore or invalidate any intersections between a shadow ray and a non-opaque (e.g., transparent) primitive, as a transparent primitive may not occlude or shadow the hit point from which the shadow ray was projected. For example, when non-opaque primitives are considered invalid shadow ray intersections, the shadow ray intersection test can be terminated once the shadow ray either intersects with the light source or intersects with any opaque scene primitive.

Shadow ray intersection testing can be performed based on traversing a BVH (e.g., such as BVH 600*a*). The BVH traversal associated with a shadow ray intersection test may also be referred to as "shadow ray BVH traversal" or "shadow ray traversal." In some examples, the same BVH 600*a* can be utilized (e.g., traversed) to perform primary ray intersection tests and to perform shadow ray intersection tests. In some cases, the same traversal technique can additionally, or alternatively, be used to perform both shadow ray BVH traversal and primary ray BVH traversal. For example, when shadow ray BVH traversal and primary ray BVH traversal are implemented using the same traversal technique, the BVH traversal can be performed as a depth-first traversal, or other traversal in which primitives closest to the virtual camera viewpoint are traversed (e.g., tested or examined) first.

Performing shadow-ray traversal based on a primary-ray traversal technique (e.g., in which primitives closest to the viewpoint are traversed first) can be inefficient. For example, shadow-ray traversal can be performed until an intersection is found with either an opaque primitive or the light source towards which the shadow ray was projected. When a BVH includes opaque and non-opaque primitives, performing intersection tests between a shadow ray and any opaque primitives that are traversed can result in wasted clock cycles (e.g., even if an intersection is found for the shadow ray and an opaque primitive, the intersection can be ignored or invalidated and the shadow ray BVH traversal continues).

For example, BVH 600*a* includes a combination of non-opaque (e.g., transparent) primitives 652, 654, and 656 and opaque primitives 655, 657, and 659. As illustrated, the non-opaque primitives 652, 654, 656 are unshaded, while the opaque primitives 655, 657, 659 are shaded. BVH nodes that include only non-opaque primitives are unshaded (e.g., BVH node 622). BVH nodes that include only opaque primitives are shaded (e.g., BVH node 614). BVH nodes that include both opaque and non-opaque primitives are partially shaded (e.g., BVH nodes 602, 612, and 624).

The bolded connecting arrows included in FIG. 6A illustrate an example of a shadow ray traversal technique with wasted clock cycles (e.g., from visiting non-opaque primitives). The example shadow ray traversal technique illustrated in FIG. 6A can be the same as or similar to a primary ray BVH traversal technique, such as the depth-first traversal technique described above wherein primitives closest to the virtual camera viewpoint are traversed first. In some aspects, the example shadow ray traversal of FIG. 6A may be performed independently of the contents of each BVH node (e.g., without considering whether a BVH node contains opaque primitives only, non-opaque primitives only, or a combination of the two).

For example, beginning at BVH root node 602, shadow ray traversal can proceed to BVH internal node 612, which includes the BVH leaf nodes 622 and 624. The traversal then continues from BVH internal node 612 to BVH leaf node 622, which includes as its children the non-opaque primitives 652 and 654.

The traversal can first visit the non-opaque primitive 652. Although any intersection determined between the shadow ray and the non-opaque primitive 652 can be ignored or invalidated (e.g., because non-opaque primitive 652 is transparent), the shadow ray traversal can perform an intersection test between the shadow ray and non-opaque primitive 652. For example, the intersection test can be performed based on invoking an any-hit shader and providing as input the shadow ray and the non-opaque primitive 652. The any-hit shader consumes one or more clock cycles to determine an intersection result. If the any-hit shader determines that the shadow ray and non-opaque primitive 652 do not intersect, the shadow ray traversal continues. If the any-hit shader determines that the shadow ray and non-opaque primitive 652 do intersect, the shadow ray traversal can also continue (e.g., because an intersection between the shadow ray and a non-opaque primitive is ignored or treated as invalid).

In this example, the shadow ray traversal pauses while the any-hit shader is invoked to determine an intersection result between the shadow ray and non-opaque primitive 652, but subsequently continues traversing BVH 600*a* regardless of the result determined by the any-hit shader (e.g., wasting the one or more clock cycles consumed by the any-hit shader invocation). Regardless of the result determined by the any-hit shader, the shadow ray traversal of BVH 600*a* proceeds next by visiting non-opaque primitive 654 (e.g., the remaining child of BVH leaf node 622).

The any-hit shader is again invoked, and one or more clock cycles consumed, to determine an intersection result between the shadow ray and non-opaque primitive 654. As described above with respect to non-opaque primitive 652, the shadow ray traversal of BVH 600a can subsequently proceed to visit the next BVH node regardless of the intersection result determined by the any-hit shader invocation for the shadow ray and non-opaque primitive 654.

For example, after invoking the any-hit shader to perform intersection tests for non-opaque primitives 652 and 654, the shadow ray traversal of BVH 600a can return to BVH node 612 and proceed to BVH leaf node 624. BVH leaf node 624 includes an opaque primitive 655 and a non-opaque primitive 656. Opaque primitive 655 may be visited first and the any-hit shader invoked to determine an intersection test result between the shadow ray and opaque primitive 655. If the any-hit shader determines that the shadow ray intersects with opaque primitive 655, the shadow ray traversal of BVH 600a can be terminated (e.g., based on shadow ray early termination, as described above).

In the example shadow ray traversal of BVH 600a illustrated in FIG. 6A, the any-hit shader is invoked three times before triggering the shadow ray early termination condition. The any-hit shader is twice invoked to determine an intersection result that can be ignored or invalidated (e.g., the intersection results between the shadow ray and the non-opaque primitives 652, 654), which can result in wasted clock cycles and/or a prolonged shadow ray BVH traversal time. Wasted clock cycles and prolonged shadow ray BVH traversal times can decrease the efficiency of ray tracing operations for shadow rays. For example, a shadow ray intersecting with or hitting a non-opaque (e.g., transparent) primitive can be associated with a polynomial degradation of performance. Systems and techniques for shadow ray BVH traversal that minimize intersection with non-opaque primitives are needed.

The systems and techniques described herein can be used to perform shadow ray BVH traversal with increased efficiency. For example, shadow ray BVH traversal can be performed by selecting (e.g., visiting), at each level of the BVH, the BVH node(s) associated with an increased probability of intersecting the shadow ray with an opaque primitive. In some aspects, a BVH can be traversed in a depth-first search (DFS) wherein selection decisions (e.g., between the multiple BVH nodes that can be traversed or visited next) are based on a probability of the shadow ray intersecting an opaque primitive included in a given BVH node.

In one illustrative example, the nodes at each BVH level (e.g., the nodes at each depth within the hierarchical tree structure associated with the BVH) can be sorted using one or more sorting parameters. For example, the sorting parameters can include, but are not limited to, an area associated with each BVH node, a Surface Area Heuristic (SAH) associated with each BVH node, a density associated with each BVH node, and/or a number of primitives associated with each BVH node (e.g., as will be described in turn below). A traversal decision can subsequently be made for each BVH level based on the sorted order of the nodes included in the given BVH level.

In some aspects, the sorting parameters can include an area associated with each node of a given BVH level. For example, the BVH nodes can be sorted based on the bounding box area (e.g., AABB area) associated with each node. The BVH nodes may be sorted in increasing area order or decreasing area order. When sorted in increasing area order, shadow ray traversal can be performed for a given BVH level by first visiting the BVH node determined to have the smallest bounding box area (e.g., the node with the smallest bounding box area is visited first and the node with the largest bounding box area is visited last). When sorted in decreasing area order, shadow ray traversal can be performed for the given BVH level by first visiting the BVH node determined to have the largest bounding box area (e.g., the node with the largest bounding box area is visited first and the node with the smallest bounding box area is visited last).

In some aspects, the sorting parameters can include a Surface Area Heuristic (SAH) associated with each node of a given BVH level. The SAH can be used to provide an estimate of the ray tracing performance of a portion (or all) of a BVH or other acceleration data structure. In some examples, the BVH nodes of a given BVH level can be sorted by SAH in increasing order or decreasing order. When sorted in increasing SAH order, shadow ray traversal can be performed for a given BVH level by first visiting the BVH node determined to have the smallest SAH (e.g., the node with the smallest SAH is visited first and the node with the largest SAH is visited last). When sorted in decreasing SAH order, shadow ray traversal can be performed for the given BVH level by first visiting the BVH node determined to have the largest SAH (e.g., the node with the largest SAH is visited first and the node with the smallest SAH is visited last).

In some aspects, the sorting parameters can include or otherwise be based on a density associated with each node of a given BVH level. In some examples, the density of a given BVH node can be determined as the density of the BVH node's subtree (e.g., also referred to herein as a "subtree density value"). The subtree of a BVH node can include one or more BVH intermediate nodes, BVH leaf nodes, scene primitives, and/or a combination thereof. In one illustrative example, the sorting parameters can include a subtree density value, wherein the subtree density of a given BVH node can be determined as the area of the given BVH node divided by the number of primitives included in the given BVH node (e.g., the number of primitives included in the subtree of the given BVH node). In some examples, the BVH nodes of a given BVH level can be sorted by density in increasing order or decreasing order. When sorted in increasing density order, shadow ray traversal can be performed for a given BVH level by first visiting the BVH node determined to have the lowest density (e.g., the node with the lowest density is visited first and the node with the highest density is visited last). When sorted in decreasing density order, shadow ray traversal can be performed for the given BVH level by first visiting the BVH node determined to have the highest density (e.g., the node with the highest density is visited first and the node with the lowest density is visited last).

In some aspects, the sorting parameters can include a number of primitives associated with each node of a given BVH level. For example, the number of primitives associated with a given BVH node can be determined as the number of primitives included in the given BVH node's subtree. In some examples, the BVH nodes of a given BVH level can be sorted by number of primitives in increasing order or decreasing order. When sorted in increasing order of number of primitives, shadow ray traversal can be performed for a given BVH level by first visiting the BVH node determined to have the smallest number of primitives (e.g., the node with the smallest number of primitives is visited first and the node with the greatest number of primitives is visited last). When sorted in decreasing order of number of primitives, shadow ray traversal can be performed for the given BVH level by first visiting the BVH node determined to have the greatest number of primitives (e.g., the node with the greatest number of primitives is visited first and the node with the smallest number of primitives is visited last).

In one illustrative example, one or more (or all) of the sorting parameters can be determined during BVH construction. For example, a BVH construction process can include determining values for the one or more sorting parameters, at one or more (or all) of the BVH nodes included in the BVH being constructed. The determined sorting parameter values can be included in or associated with the resulting BVH, can be stored separately from the BVH (e.g., and accessed during shadow ray BVH traversal), or a combination of the two.

In some examples, the systems and techniques can group the sorted BVH nodes at each BVH level visited during the shadow ray traversal. For example, a first group can include BVH nodes with opaque primitives and a second group can include BVH nodes with non-opaque primitives. The first group can include BVH nodes that contain only opaque primitives and/or can include BVH nodes that include at least one opaque primitive. In some examples, when a first group includes BVH nodes that contain opaque primitives only, a second group can be generated to include BVH nodes that contain combinations of opaque and non-opaque primitives, and a third group can be generated to include BVH nodes that contain non-opaque primitives only. In one illustrative example, the sorted BVH nodes of a given BVH level can be ordered based on the grouping(s) described above (e.g., groups that include BVH nodes with opaque primitives can be traversed or visited before groups that include BVH nodes with non-opaque primitives). For example, the BVH nodes included in the first group can be traversed first, followed by the BVH nodes included in the second group (and, if present, followed by the BVH nodes included in the third group, etc.)

In some aspects, grouping can be applied to the already sorted BVH nodes (e.g., sorted based on a sorting parameter, as described above). In some cases, grouping can be applied before sorting the BVH nodes. For example, the BVH nodes at a given BVH level can first be sorted into groups based on whether the BVH nodes include opaque primitives. Groups of BVH nodes that include opaque primitives can be sorted to be before groups of BVH nodes that do not include opaque primitives (e.g., include only non-opaque primitives). The BVH nodes included in each distinct group may subsequently be sorted based on the sorting parameter(s) described above. For example, the BVH nodes within each group can be re-ordered based on selected sorting parameter while the overall ordering of the BVH node groups remains unchanged.

In some cases, the group(s) of BVH nodes with opaque primitives can undergo the subsequent sorting (e.g., based on the sorting parameter(s) described above) and the group of BVH nodes with non-opaque primitives only does not undergo any subsequent sorting. For example, shadow ray BVH traversal may terminate when an intersection is found between the shadow ray and the light source or the shadow ray and any non-opaque primitive, whichever comes first (e.g., shadow ray early termination). Because the non-opaque group of BVH nodes does not contain any opaque primitives, and because the shadow ray BVH traversal begins by visiting the group of BVH nodes that do contain opaque primitives, the shadow ray BVH traversal should terminate before needing to visit the group of non-opaque BVH nodes (e.g., the group of non-opaque BVH nodes can be left unsorted because it will not be traversed or otherwise visited).

Figure 6B:
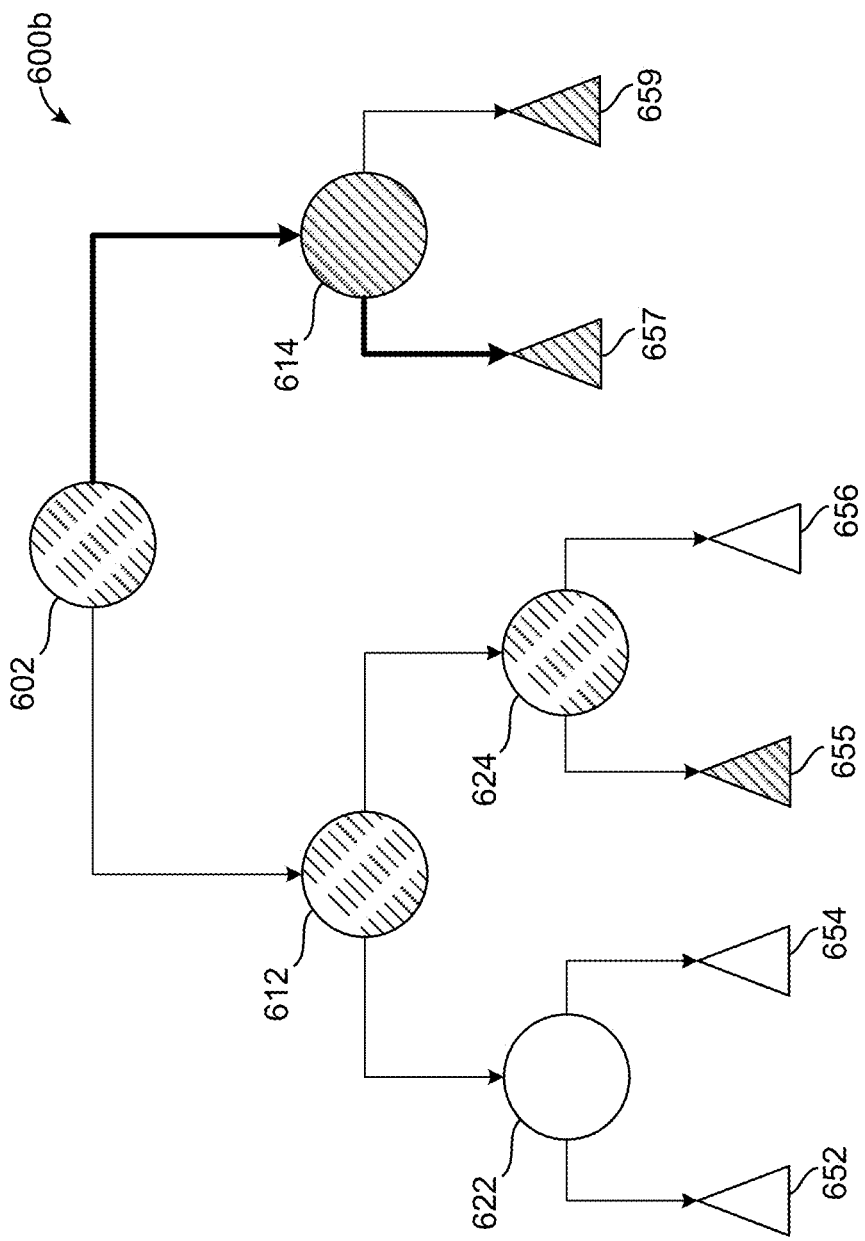
FIG. 6B another example of an acceleration data structure used for shadow ray intersection, in accordance with some examples of the present disclosure.

FIG. 6B depicts an example shadow ray BVH traversal 600b, according to aspects of the present disclosure. In some examples, BVH 600b can be the same as BVH 600a described above with respect to FIG. 6A. As will be described in greater depth below, the systems and techniques can be used to perform shadow ray traversal for BVH 600b by selecting, at each traversal step, a BVH node with an increased probability of shadow ray-opaque primitive intersection. In some aspects, a shadow ray-opaque primitive intersection can occur for a given BVH node when the BVH node includes one or more opaque primitives, and a shadow ray intersects with any of the one or more opaque primitives included in the BVH node. As illustrated, the traversal steps are depicted as bolded connecting arrows between pairs of BVH nodes.

In some aspects, beginning at BVH root node 602, the systems and techniques can sort the BVH nodes of the next BVH level using one or more sorting parameters and/or BVH node grouping, as described above. For example, when shadow ray traversal beings at BVH Root node 602, the next BVH level can be the level within BVH 600b that is located immediately below BVH root node 602. As illustrated, the next BVH level includes BVH internal node 612 and BVH leaf node 614.

In one illustrative example, the BVH nodes of a given BVH level (e.g., nodes 612 and 614) can be sorted in a decreasing order based on each node's density parameter (e.g., using density as the sorting parameter). In the decreasing order density sorting, the BVH node with the greatest density is provided first in the sorted order and the BVH node with the lowest density is provided last in the sorted order. In the example of FIG. 6B, the BVH internal node 612 may have a greater density than the BVH leaf node 614, and would be sorted first in the sort order.

Grouping is additionally to the BVH nodes 612 and 614, based on the type or contents associated with each node. For example, a first group can be generated to include only BVH nodes with opaque primitives and a second group can be generated to include only BVH nodes with non-opaque primitives. The BVH leaf node 614 includes only the opaque primitives 657 and 659 and can be assigned to the first group. The BVH internal node 612 includes the non-opaque (e.g., transparent) primitives 652, 654, and 656 and also includes the opaque primitive 655, and can be assigned to the second group. As described above, an additional sorting can be performed such that the first group of opaque BVH nodes is ordered before the second group of non-opaque BVH nodes.

In the example of FIG. 6B, BVH leaf node 614 can be sorted earlier in the sort order than BVH internal node 612 based on this grouping, despite BVH leaf node 614 having a lower density sorting parameter than BVH internal node 612. In other words, although BVH internal node 612 was determined to be a denser node (e.g., and otherwise would have been traversed first), the use of grouping causes BVH leaf node 614 to be traversed first (e.g., because BVH leaf node 614 includes only opaque primitives and may be associated with a greater probability of shadow ray early termination).

In another illustrative example, the systems and techniques can perform shadow ray BVH traversal with increased efficiency based on sorting the BVH nodes of a given BVH level in increasing order of number of non-opaque (e.g., transparent) primitives included in each given node. For example, the BVH node with the fewest non-opaque primitives can be first in the sorted order and the BVH node with the most non-opaque primitives can be last in the sorted order. The initial sort based on the contained quantity of non-opaque primitives can be applied to each BVH node of the BVH level. In this example, BVH nodes that contain only opaque primitives (e.g., contain zero non-opaque primitives) would be sorted first in the sort order.

An additional sort can then be applied to the BVH nodes that contain opaque primitives, for example using one or more of the sorting parameters described above (e.g., node area, node SAH, node density, node total number of included primitives). For example, the additional sort can be applied to BVH nodes that contain only opaque primitives (e.g., such as BVH leaf node 614) and/or BVH nodes that contain at opaque and non-opaque primitives (e.g., such as BVH internal node 612). The additional sort may be omitted for BVH nodes that include only non-opaque primitives (e.g., BVH leaf node 622).

In some aspects, the additional sort can be applied to the BVH nodes that contain opaque primitives based on the SAH sorting parameter, where the opaque BVH nodes are sorted in decreasing order of SAH. For example, based on the additional sort, opaque BVH nodes with a lower SAH can be placed earlier in the sort order than opaque BVH nodes with a higher SAH (e.g., with non-opaque BVH nodes pushed to the end of the sort order). In some examples, shadow ray BVH traversal based on an increasing order sort of all BVH nodes of a given BVH level by their number of included non-opaque primitives, followed by an increasing order SAH sort of the opaque BVH nodes, can be utilized in lower (e.g., deeper) BVH levels. For example, in lower or deeper levels of a BVH, a greater quantity of BVH nodes may be present in each level and can provide greater granularity and differentiation in the resulting sort order generated using the two-stage sort approach described above.

In another illustrative example, the systems and techniques can perform shadow ray BVH traversal with increased efficiency by sorting the BVH nodes of a given BVH level based on a relative SAH determined for each BVH node. For example, when shadow ray BVH traversal reaches a new level of the BVH (e.g., and must decide which particular BVH node of the given BVH level to traverse or visit next), the BVH node determined to have the largest relative SAH can be traversed first.

In some aspects, relative SAH can be determined as an amount of opaqueness that is spread over a parent node (e.g., each given BVH node of the level) with respect to the amount of non-opaqueness that is spread over the same parent node. For example, the relative SAH for a BVH node can be determined as:

$$\text{Relative } SAH = \frac{SAH(\text{opaque})}{SAH(\text{non-opaque})} \quad \text{Eq. (1)}$$

Here, SAH(opaque) can be determined as the aggregate SAH over the opaque primitives of the given BVH node and SAH(non-opaque) can be determined as the aggregate SAH over the non-opaque (e.g., transparent) primitives of the given BVH node.

In some aspects, the relative SAH value determined for a given BVH node can be associated with the probability that a shadow ray will intersect or hit an opaque primitive included within the BVH node. For example, in a lower relative SAH value, the denominator of Eq. (1) may dominate due to the SAH contribution of a relatively high presence of non-opaque (e.g., transparent) primitives. In a higher relative SAH value, the numerator of Eq. (1) may dominate due to the SAH contribution of a relatively high presence of opaque primitives.

In some examples, the relative SAH can be determined for each BVH node of a given BVH level (e.g., using Eq. (1)), and the BVH nodes can then be sorted in decreasing order of relative SAH. For example, the BVH node with the greatest relative SAH value can be ordered first in the sort order (e.g., the node with the greatest probability of hitting an opaque primitive) and the BVH node with the smallest relative SAH value can be ordered last in the sort order (e.g., the node with the smallest probability of hitting an opaque primitive). Shadow ray BVH traversal can then proceed through the various levels of the BVH (e.g., using depth-first search), with the nodes of each newly traversed or encountered level being sorted based on relative SAH, until a shadow ray-opaque primitive intersection is found and the shadow ray early termination condition is triggered. In some aspects, the systems and techniques perform shadow ray BVH traversal with improved efficiency based on every traversal decision (e.g., every selection of the next BVH node to visit, out of the set of candidate BVH nodes that could be visited) maximizing the relative probability of finding a shadow ray-opaque primitive intersection.

FIG. 7 is a flowchart illustrating an example of a process 700 for graphics processing. Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

At block 702, the process 700 includes obtaining a hierarchical acceleration data structure, the hierarchical data structure including one or more primitives of a scene object. For example, the acceleration data structure can be obtained by or from the acceleration data structure engine 522 associated with the ray tracing system 500 illustrated in FIG. 5. In some cases, the acceleration data structure can include a bounding volume hierarchy (BVH). For example, a BVH can be the same as or similar to one or more of the BVH 400b illustrated in FIG. 4B, the BVH 600a illustrated in FIG. 6A, and/or the BVH 600b illustrated in FIG. 6B. In some examples, the acceleration data structure can include a bottom-level acceleration structure (BLAS). For example, the acceleration data structure can include the BLAS 430 illustrated in FIG. 4A. In some cases, the one or more primitives of the scene object can be included in one or more leaf nodes of the acceleration data structure. For example, the one or more primitives of the scene object can be included in one or more of the leaf nodes 481, 482, and/or 491 illustrated in FIG. 4B; one or more of the leaf nodes 622, 624, and/or 614 illustrated in FIG. 6A; and/or one or more of the leaf nodes 622, 624, and/or 614 illustrated in FIG. 6B.

In some examples, the acceleration data structure can include a BLAS that is associated with a top-level acceleration structure (TLAS) leaf node. In examples where the acceleration data structure includes a BLAS, the BLAS can additionally, or alternatively, include one or more intermediate BLAS nodes. One or more of the intermediate BLAS nodes can include an axis-aligned bounding box (AABB) encompassing a subset of the one or more primitives of the scene object.

At block 704, the process 700 includes sorting two or more nodes included in a same level of the hierarchical acceleration data structure into a sort order based on a sorting parameter value determined for each respective node of the two or more nodes. The sorting parameter value can be associated with a probability of determining a ray-opaque primitive intersection for each respective node of the two or more nodes. For example, a ray-opaque primitive intersection can be the same as or similar to the example ray-opaque primitive intersection depicted in FIG. 1C between shadow ray 164 and opaque primitive 135.

In some examples, sorting the two or more nodes can include determining a group of opaque nodes from the two or more nodes sorted into the sort order, wherein each opaque node included in the group of opaque nodes includes one or more opaque primitives. For example, the group of opaque nodes can include the opaque nodes 612, 624, 614 illustrated in FIGS. 6A and 6B, wherein the opaque nodes 612 and 624 include the opaque primitive 655 and the opaque node 614 includes the opaque primitives 657 and 659. The process 700 can further include determining a group of non-opaque nodes from the two or more nodes sorted into the sort order, wherein each non-opaque node included in the group of non-opaque nodes includes non-opaque primitives. For example, the group of non-opaque nodes can include the non-opaque node 622 illustrated in FIGS. 6A and 6B.

In some examples, the process 700 can further include updating the sort order to include the group of opaque nodes before the group of non-opaque nodes. For example, one or more (or all) of the opaque nodes 612, 624, and/or 614 can be included in the sort order before the non-opaque node 622 (e.g., illustrated in FIGS. 6A and 6B). In some examples, the sort order can be based on a sorting parameter value that is a subtree density value determined for each respective node of the two or more nodes. The sort order can be a decreasing order based on the subtree density value determined for each respective node of the two or more nodes.

In some examples, the process 700 can further include determining the sorting parameter value as a relative Surface Area Heuristic (SAH) value associated with each respective node of the two or more nodes. In some cases, determining the sorting parameter value as the relative SAH value associated with each respective node of the two or more nodes further comprises determining an aggregate SAH value for one or more opaque primitives included in each respective node. An aggregate SAH value can additionally be determined for one or more non-opaque primitives included in each respective node. The relative SAH value can be determined as a ratio of the aggregate SAH value for the one or more opaque primitives and the aggregate SAH value for the one or more non-opaque primitives. In some cases, the sort order can be a decreasing order based on the relative SAH associated with each respective node of the two or more nodes.

In some examples, the sorting parameter value for each respective node of the two or more nodes can be determined as a bounding box area associated with each respective node. In some cases, the sorting parameter value for each respective node of the two or more nodes can be determined as a Surface Area Heuristic (SAH) value associated with each respective node. In some examples, the sorting parameter value for each respective node of the two or more nodes can be determined as a subtree density value associated with each respective node. In some examples, the sorting parameter value for each respective node of the two or more nodes can be determined as a quantity of primitives included in a subtree associated with each respective node.

In some examples, determining the sorting parameter value for each respective node of the two or more nodes can be based on a quantity of non-opaque primitives included in each respective node, wherein the sort order is an increasing order based on the quantity of non-opaque primitives. In some cases, the sort order can be updated based on performing an additional sort for one or more opaque nodes included in the sort order and determined to include opaque primitives, wherein the additional sort is based on an additional sorting parameter value determined for each respective node of the one or more opaque nodes. For example, the additional sorting parameter value can include at least one of a bounding box area associated with each of the one or more opaque nodes, a Surface Area Heuristic (SAH) value associated with each of the one or more opaque nodes, a subtree density value associated with each of the one or more opaque nodes, or a quantity of primitives included in a subtree associated with each of the one or more opaque nodes. In some cases, the additional sorting parameter value can be a Surface Area Heuristic (SAH) value determined for each opaque node of the one or more opaque nodes, and the additional sort can comprise sorting the one or more opaque nodes into an increasing order based on the SAH value determined for each of the one or more opaque nodes.

At block 706, the process 700 includes determining an intersection between a shadow ray and an opaque primitive included in a node of the two or more nodes, based on traversing the hierarchical acceleration data structure using the sort order. For example, an intersection can be determined between a shadow ray and the opaque primitive 657 illustrated in FIG. 6B, based on traversing the hierarchical acceleration data structure (e.g., BVH) 600b also illustrated in FIG. 6B. In some examples, the hierarchical acceleration data structure 600b illustrated in FIG. 6B can be traversed using the sort order by traversing initially from node 602 to node 614, and from node 614 to the child opaque primitive 657.

In some examples, the processes described herein (e.g., process 700 and/or any other process described herein) may be performed by a computing device, apparatus, or system. In one example, the process 700 can be performed by a computing device or system having the computing device architecture 800 of FIG. 8. The computing device, apparatus, or system can include any suitable device, such as a mobile device (e.g., a mobile phone), a desktop computing device, a tablet computing device, a wearable device (e.g., a VR headset, an AR headset, AR glasses, an extended reality (XR) headset, a network-connected watch or smartwatch, or other wearable device), a server computer, a vehicle or computing device of a vehicle, a robotic device, a laptop computer, a smart television, a camera, and/or any other computing device with the resource capabilities to perform the processes described herein, including the process 700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
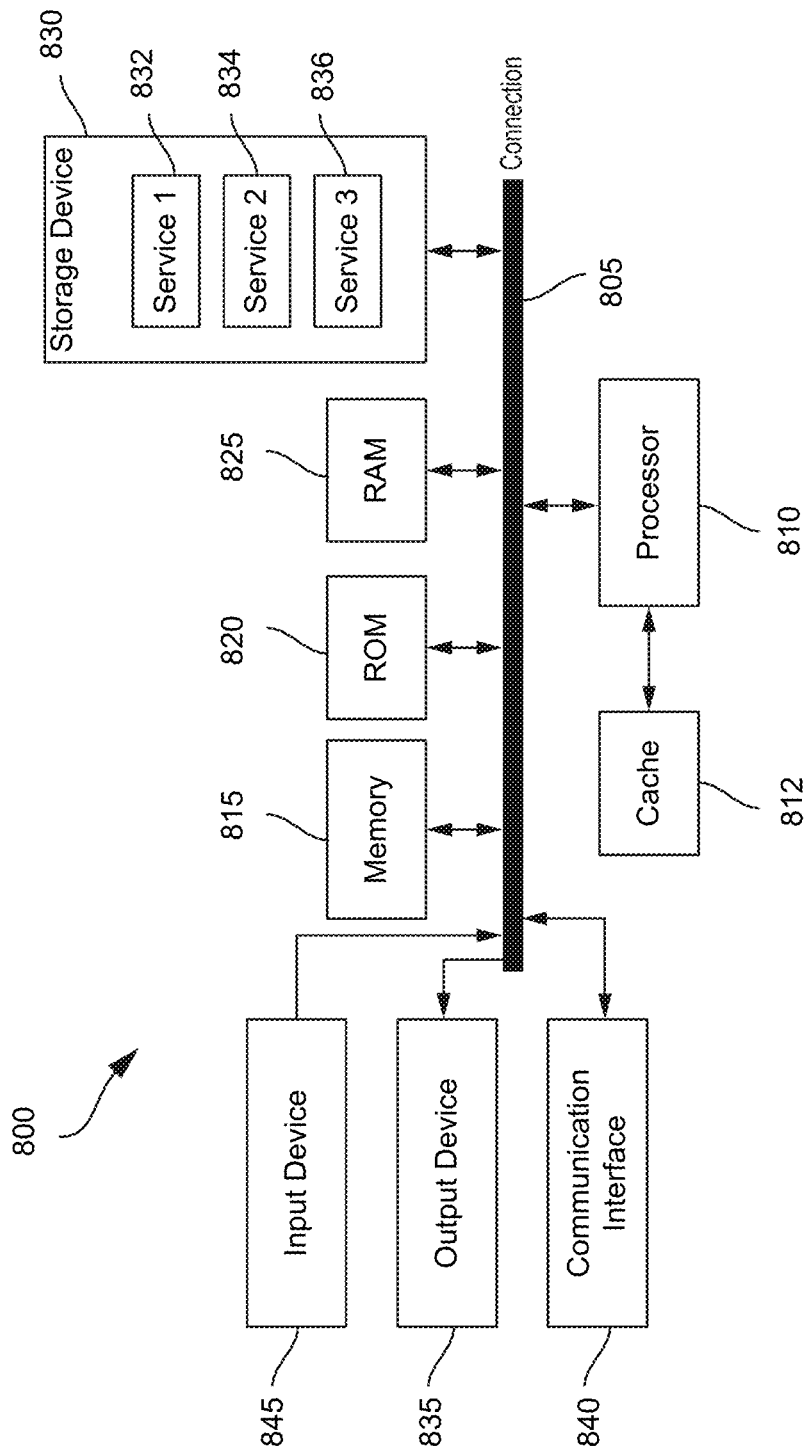
FIG. 8 is a block diagram illustrating an example of a computing system for implementing certain aspects described herein.

FIG. 8 illustrates an example computing device architecture 800 of an example computing device which can implement the various techniques described herein. In some examples, the computing device can include a mobile device, a wearable device, an extended reality device (e.g., a virtual reality (VR) device, an augmented reality (AR) device, an extended reality (XR) device, or a mixed reality (MR) device), a personal computer, a laptop computer, a video server, a vehicle (or computing device of a vehicle), or other device. The components of computing device architecture 800 are shown in electrical communication with each other using connection 805, such as a bus. The example computing device architecture 800 includes a processing unit (CPU or processor) 810 and computing device connection 805 that couples various computing device components including computing device memory 815, such as read only memory (ROM) 820 and random-access memory (RAM) 825, to processor 810.

Computing device architecture 800 can include a cache of high-speed memory connected directly with, in close proximity to, or integrated as part of processor 810 Computing device architecture 800 can copy data from memory 815 and/or the storage device 830 to cache 812 for quick access by processor 810. In this way, the cache can provide a performance boost that avoids processor 810 delays while waiting for data. These and other engines can control or be configured to control processor 810 to perform various actions. Other computing device memory 815 may be available for use as well. Memory 815 can include multiple different types of memory with different performance characteristics. Processor 810 can include any general-purpose processor and a hardware or software service, such as service 1 832, service 2 834, and service 3 836 stored in storage device 830, configured to control processor 810 as well as a special-purpose processor where software instructions are incorporated into the processor design. Processor 810 may be a self-contained system, containing multiple cores or processors, a bus, memory controller, cache, etc. A multi-core processor may be symmetric or asymmetric.

To enable user interaction with the computing device architecture 800, input device 845 can represent any number of input mechanisms, such as a microphone for speech, a touch-sensitive screen for gesture or graphical input, keyboard, mouse, motion input, speech and so forth. Output device 835 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. Storage device 830 can include services 832, 834, 836 for controlling processor 810. Other hardware or software modules or engines are contemplated. Storage device 830 can be connected to the computing device connection 805. In one aspect, a hardware module that performs a particular function can include the software component stored in a computer-readable medium in connection with the necessary hardware components, such as processor 810, connection 805, output device 835, and so forth, to carry out the function.

Aspects of the present disclosure are applicable to any suitable electronic device (such as security systems, smartphones, tablets, laptop computers, vehicles, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of ray tracing, the method comprising: obtaining a hierarchical acceleration data structure, the hierarchical acceleration data structure including one or more primitives of a scene object; sorting two or more nodes included in a same level of the hierarchical acceleration data structure into a sort order based on a sorting parameter value determined for each respective node of the two or more nodes, wherein the sorting parameter value is associated with a probability of determining a ray-opaque primitive intersection for each respective node of the two or more nodes; and determining an intersection between a shadow ray and an opaque primitive included in a node of the two or more nodes based on traversing the hierarchical acceleration data structure using the sort order.

Aspect 2: The method of Aspect 1, further comprising determining the sorting parameter value as a relative Surface Area Heuristic (SAH) value associated with each respective node of the two or more nodes.

Aspect 3: The method of Aspect 2, wherein determining the sorting parameter value as the relative SAH value associated with each respective node of the two or more nodes further comprises: determining an aggregate SAH value for one or more opaque primitives included in each respective node; determining an aggregate SAH value for one or more non-opaque primitives included in each respective node; and determining the relative SAH value as a ratio of the aggregate SAH value for the one or more opaque primitives and the aggregate SAH value for the one or more non-opaque primitives.

Aspect 4: The method of any of Aspects 2 to 3, wherein the sort order is a decreasing order based on the relative SAH value associated with each respective node of the two or more nodes.

Aspect 5: The method of any of Aspects 1 to 4, further comprising determining the sorting parameter value for each respective node of the two or more nodes as a bounding box area associated with each respective node.

Aspect 6: The method of any of Aspects 1 to 5, further comprising determining the sorting parameter value for each respective node of the two or more nodes as a Surface Area Heuristic (SAH) value associated with each respective node.

Aspect 7: The method of any of Aspects 1 to 6, further comprising determining the sorting parameter value for each respective node of the two or more nodes as a subtree density value associated with each respective node.

Aspect 8: The method of any of Aspects 1 to 7, further comprising determining the sorting parameter value for each respective node of the two or more nodes as a quantity of primitives included in a subtree associated with each respective node.

Aspect 9: The method of any of Aspects 1 to 8, wherein sorting the two or more nodes further comprises: determining a group of opaque nodes from the two or more nodes sorted into the sort order, wherein each opaque node included in the group of opaque nodes includes one or more opaque primitives; and determining a group of non-opaque nodes from the two or more nodes sorted into the sort order, wherein each non-opaque node included in the group of non-opaque nodes includes non-opaque primitives.

Aspect 10: The method of Aspect 9, further comprising updating the sort order to include the group of opaque nodes before the group of non-opaque nodes.

Aspect 11: The method of Aspect 10, wherein: the sorting parameter value is a subtree density value determined for each respective node of the two or more nodes; and the sort order is a decreasing order based on the subtree density value determined for each respective node of the two or more nodes.

Aspect 12: The method of any of Aspects 1 to 11, further comprising determining the sorting parameter value for each respective node of the two or more nodes as a quantity of non-opaque primitives included in each respective node, wherein the sort order is an increasing order based on the quantity of non-opaque primitives.

Aspect 13: The method of Aspect 12, further comprising: updating the sort order based on performing an additional sort for one or more opaque nodes included in the sort order and determined to include opaque primitives; wherein the additional sort is based on an additional sorting parameter value determined for each respective node of the one or more opaque nodes.

Aspect 14: The method of Aspect 13, wherein the additional sorting parameter value includes at least one of a bounding box area associated with each of the one or more opaque nodes, a Surface Area Heuristic (SAH) value associated with each of the one or more opaque nodes, a subtree density value associated with each of the one or more opaque nodes, or a quantity of primitives included in a subtree associated with each of the one or more opaque nodes.

Aspect 15: The method of any of Aspects 13 to 14, wherein: the additional sorting parameter value is a Surface Area Heuristic (SAH) value determined for each opaque node of the one or more opaque nodes; and the additional sort comprises sorting the one or more opaque nodes into an increasing order based on the SAH value determined for each of the one or more opaque nodes.

Aspect 16: An apparatus for ray tracing, comprising: a memory; and one or more processors coupled to the memory, the one or more processors configured to: obtain a hierarchical acceleration data structure, the hierarchical acceleration data structure including one or more primitives of a scene object; sort two or more nodes included in a same level of the hierarchical acceleration data structure into a sort order based on a sorting parameter value determined for each respective node of the two or more nodes, wherein the sorting parameter value is associated with a probability of determining a ray-opaque primitive intersection for each respective node of the two or more nodes; and determine an intersection between a shadow ray and an opaque primitive included in a node of the two or more nodes based on traversing the hierarchical acceleration data structure using the sort order.

Aspect 17: The apparatus of Aspect 16, wherein the one or more processors are further configured to determine the sorting parameter value as a relative Surface Area Heuristic (SAH) value associated with each respective node of the two or more nodes.

Aspect 18: The apparatus of Aspect 17, wherein to determine the sorting parameter value as the relative SAH value associated with each respective node of the two or more nodes, the one or more processors are further configured to: determine an aggregate SAH value for one or more opaque primitives included in each respective node; determine an aggregate SAH value for one or more non-opaque primitives included in each respective node; and determine the relative SAH value as a ratio of the aggregate SAH value for the one or more opaque primitives and the aggregate SAH value for the one or more non-opaque primitives.

Aspect 19: The apparatus of any of Aspects 17 to 18, wherein the sort order is a decreasing order based on the relative SAH value associated with each respective node of the two or more nodes.

Aspect 20: The apparatus of any of Aspects 16 to 19, wherein the one or more processors are further configured to determine the sorting parameter value for each respective node of the two or more nodes as a bounding box area associated with each respective node.

Aspect 21: The apparatus of any of Aspects 16 to 20, wherein the one or more processors are further configured to determine the sorting parameter value for each respective node of the two or more nodes as a Surface Area Heuristic (SAH) value associated with each respective node.

Aspect 22: The apparatus of any of Aspects 16 to 21, wherein the one or more processors are further configured to determine the sorting parameter value for each respective node of the two or more nodes as a subtree density value associated with each respective node.

Aspect 23: The apparatus of any of Aspects 16 to 22, wherein the one or more processors are further configured to determine the sorting parameter value for each respective node of the two or more nodes as a quantity of primitives included in a subtree associated with each respective node.

Aspect 24: The apparatus of any of Aspects 16 to 23, wherein to sort the two or more nodes, the one or more processors are further configured to: determine a group of opaque nodes from the two or more nodes sorted into the sort order, wherein each opaque node included in the group of opaque nodes includes one or more opaque primitives; and determine a group of non-opaque nodes from the two or more nodes sorted into the sort order, wherein each non-opaque node included in the group of non-opaque nodes includes non-opaque primitives.

Aspect 25: The apparatus of Aspect 24, wherein the one or more processors are further configured to update the sort order to include the group of opaque nodes before the group of non-opaque nodes.

Aspect 26: The apparatus of Aspect 25, wherein: the sorting parameter value is a subtree density value determined for each respective node of the two or more nodes; and the sort order is a decreasing order based on the subtree density value determined for each respective node of the two or more nodes.

Aspect 27: The apparatus of Aspect 26, wherein the one or more processors are further configured to determine the sorting parameter value for each respective node of the two or more nodes as a quantity of non-opaque primitives included in each respective node, wherein the sort order is an increasing order based on the quantity of non-opaque primitives.

Aspect 28: The apparatus of any of Aspects 26 to 27, wherein the one or more processors are further configured to: update the sort order based on performing an additional sort for one or more opaque nodes included in the sort order and determined to include opaque primitives; wherein the additional sort is based on an additional sorting parameter value determined for each respective node of the one or more opaque nodes.

Aspect 29: The apparatus of Aspect 28, wherein the additional sorting parameter value includes at least one of a bounding box area associated with each of the one or more opaque nodes, a Surface Area Heuristic (SAH) value associated with each of the one or more opaque nodes, a subtree density value associated with each of the one or more opaque nodes, or a quantity of primitives included in a subtree associated with each of the one or more opaque nodes.

Aspect 30: The apparatus of any of Aspects 28 to 29, wherein: the additional sorting parameter value is a Surface Area Heuristic (SAH) value determined for each opaque node of the one or more opaque nodes; and the additional sort comprises sorting the one or more opaque nodes into an increasing order based on the SAH value determined for each of the one or more opaque nodes.

Aspect 31: An apparatus comprising means for performing any of the operations of Aspects 1 to 30.

Aspect 32: A non-transitory computer-readable storage medium having stored thereon instructions which, when executed by one or more processors, cause the one or more processors to perform any of the operations of Aspects 1 to 30.

What is claimed is:

1. A method of ray tracing, the method comprising:
   obtaining a hierarchical acceleration data structure, the hierarchical acceleration data structure including one or more primitives of a scene object;
   determining a sorting parameter value as a relative Surface Area Heuristic (SAH) value associated with each respective node of two or more nodes included in a same level of the hierarchical acceleration data structure by:
      determining an aggregate SAH value for one or more opaque primitives included in each respective node;
      determining an aggregate SAH value for one or more non-opaque primitives included in each respective node; and
      determining the relative SAH value as a ratio of the aggregate SAH value for the one or more opaque primitives and the aggregate SAH value for the one or more non-opaque primitives;
   sorting the two or more nodes into a sort order based on the sorting parameter value determined for each respective node of the two or more nodes; and
   determining an intersection between a shadow ray and an opaque primitive included in a node of the two or more nodes based on traversing the hierarchical acceleration data structure using the sort order.

2. The method of claim 1, wherein the sort order is a decreasing order based on the relative SAH value associated with each respective node of the two or more nodes.

3. The method of claim 1, wherein sorting the two or more nodes further comprises:
   determining a group of opaque nodes from the two or more nodes sorted into the sort order, wherein each opaque node included in the group of opaque nodes includes one or more opaque primitives; and
   determining a group of non-opaque nodes from the two or more nodes sorted into the sort order, wherein each non-opaque node included in the group of non-opaque nodes includes non-opaque primitives.

4. The method of claim 3, further comprising updating the sort order to include the group of opaque nodes before the group of non-opaque nodes.

5. The method of claim 1, further comprising:
   updating the sort order based on performing an additional sort for one or more opaque nodes included in the sort order and determined to include opaque primitives;
   wherein the additional sort is based on an additional sorting parameter value determined for each respective node of the one or more opaque nodes.

6. The method of claim 5, wherein the additional sorting parameter value includes at least one of a bounding box area associated with each of the one or more opaque nodes, a Surface Area Heuristic (SAH) value associated with each of the one or more opaque nodes, a subtree density value associated with each of the one or more opaque nodes, or a quantity of primitives included in a subtree associated with each of the one or more opaque nodes.

7. The method of claim 5, wherein:
   the additional sorting parameter value is a Surface Area Heuristic (SAH) value determined for each opaque node of the one or more opaque nodes; and
   the additional sort comprises sorting the one or more opaque nodes into an increasing order based on the SAH value determined for each of the one or more opaque nodes.

8. An apparatus for ray tracing, comprising:
   a memory; and
   one or more processors coupled to the memory, the one or more processors configured to:
      obtain a hierarchical acceleration data structure, the hierarchical acceleration data structure including one or more primitives of a scene object;
      determine a sorting parameter value as a relative Surface Area Heuristic (SAH) value associated with each respective node of two or more nodes included in a same level of the hierarchical acceleration data structure, wherein, to determine the sorting parameter value, the one or more processors are further configured to:
         determine an aggregate SAH value for one or more opaque primitives included in each respective node;
         determine an aggregate SAH value for one or more non-opaque primitives included in each respective node; and
         determine the relative SAH value as a ratio of the aggregate SAH value for the one or more opaque primitives and the aggregate SAH value for the one or more non-opaque primitives;
      sort the two or more nodes into a sort order based on the sorting parameter value determined for each respective node of the two or more nodes; and
      determine an intersection between a shadow ray and an opaque primitive included in a node of the two or more nodes based on traversing the hierarchical acceleration data structure using the sort order.

9. The apparatus of claim 8, wherein the sort order is a decreasing order based on the relative SAH value associated with each respective node of the two or more nodes.

10. The apparatus of claim 8, wherein to sort the two or more nodes, the one or more processors are further configured to:
  determine a group of opaque nodes from the two or more nodes sorted into the sort order, wherein each opaque node included in the group of opaque nodes includes one or more opaque primitives; and
  determine a group of non-opaque nodes from the two or more nodes sorted into the sort order, wherein each non-opaque node included in the group of non-opaque nodes includes non-opaque primitives.

11. The apparatus of claim 10, wherein the one or more processors are further configured to update the sort order to include the group of opaque nodes before the group of non-opaque nodes.

12. The apparatus of claim 8, wherein the one or more processors are further configured to:
  update the sort order based on performing an additional sort for one or more opaque nodes included in the sort order and determined to include opaque primitives; wherein the additional sort is based on an additional sorting parameter value determined for each respective node of the one or more opaque nodes.

13. The apparatus of claim 12, wherein the additional sorting parameter value includes at least one of a bounding box area associated with each of the one or more opaque nodes, a Surface Area Heuristic (SAH) value associated with each of the one or more opaque nodes, a subtree density value associated with each of the one or more opaque nodes, or a quantity of primitives included in a subtree associated with each of the one or more opaque nodes.

14. The apparatus of claim 12, wherein:
  the additional sorting parameter value is a Surface Area Heuristic (SAH) value determined for each opaque node of the one or more opaque nodes; and
  the additional sort comprises sorting the one or more opaque nodes into an increasing order based on the SAH value determined for each of the one or more opaque nodes.

* * * * *